(12) United States Patent
Langdale et al.

(10) Patent No.: US 10,605,399 B2
(45) Date of Patent: Mar. 31, 2020

(54) APPARATUS AND METHOD FOR INSTALLING A CONNECTION FITTING INTO A MAIN PIPELINE

(71) Applicant: Synthotech Limited, Harrogate (GB)

(72) Inventors: Simon John Langdale, Methley (GB); Wesley James Little, Baildon (GB)

(73) Assignee: Synthotech Limited, Harrogate (GB)

( * ) Notice: Subject to any disclaimer, the term of this patent is extended or adjusted under 35 U.S.C. 154(b) by 175 days.

(21) Appl. No.: 15/520,240

(22) PCT Filed: Oct. 19, 2015

(86) PCT No.: PCT/EP2015/074149
§ 371 (c)(1),
(2) Date: Apr. 19, 2017

(87) PCT Pub. No.: WO2016/062664
PCT Pub. Date: Apr. 28, 2016

(65) Prior Publication Data
US 2017/0307127 A1    Oct. 26, 2017

(30) Foreign Application Priority Data

Oct. 19, 2014 (GB) .................................. 1418540.9
Oct. 20, 2014 (GB) .................................. 1418653.0
May 29, 2015 (GB) .................................. 1509348.7

(51) Int. Cl.
*F16L 55/26* (2006.01)
*F16L 41/08* (2006.01)

(52) U.S. Cl.
CPC ........... *F16L 55/265* (2013.01); *F16L 41/082* (2013.01)

(58) Field of Classification Search
CPC .............................. F16L 55/265; F16L 41/082
See application file for complete search history.

(56) References Cited

U.S. PATENT DOCUMENTS 6,206,049 B1    3/2001  Ward
2003/0106601 A1 6/2003  Kweon
(Continued)

FOREIGN PATENT DOCUMENTS

EP    0 260 220 A1    3/1988
EP    0 423 640 A2    4/1991
(Continued)

OTHER PUBLICATIONS

International Search Report, International Application No. PCT/EP2015/074149, dated Jan. 22, 2016.
(Continued)

*Primary Examiner* — John C Hong
(74) *Attorney, Agent, or Firm* — Myers Bigel, P.A.

(57) ABSTRACT

An apparatus for installing a connection fitting into an aperture formed in a wall of a main pipeline in the making of a service connection between a side connection and the main pipeline includes propulsion means for propelling the apparatus along the main pipeline to a site at which the service connection is to be made, and installation means for installing, from within the main pipeline, at least a portion of the connection fitting into the aperture. The installation means may include a storage device for storing at least one connection fitting intended for installation, a conveyance device for conveying a connection fitting to be installed from the storage device to an installation location, and an insertion device for inserting the connection fitting conveyed to the installation pad or platform from the installation pad or platform into the aperture formed in the wall of the main pipeline.

19 Claims, 14 Drawing Sheets

(56) References Cited

U.S. PATENT DOCUMENTS

2003/0116211 A1    6/2003  Ward
2012/0291939 A1  11/2012  Warren et al.

FOREIGN PATENT DOCUMENTS

| EP | 0 823 579 A1 | 2/1998 |
|---|---|---|
| JP | 8-198426 A | 8/1996 |
| JP | 2001-116180 A | 4/2001 |
| KR | 10-2012-0103869 A | 9/2012 |
| WO | WO 92/17728 A1 | 10/1992 |

OTHER PUBLICATIONS

Written Opinion of the International Searching Authority, International Application No. PCT/EP2015/074149, dated Jan. 22, 2016.
Patents Act 1977: Combined Search and Examination Report under Sections 17 and 18(3), GB Application No. GB 1509348.7, dated Dec. 11, 2015.

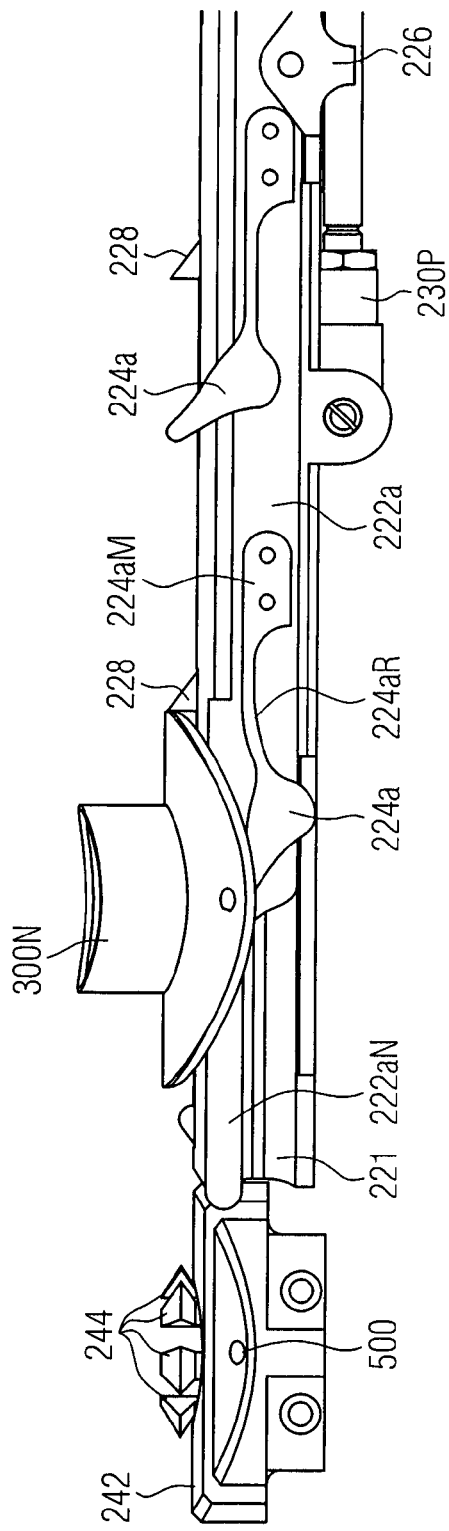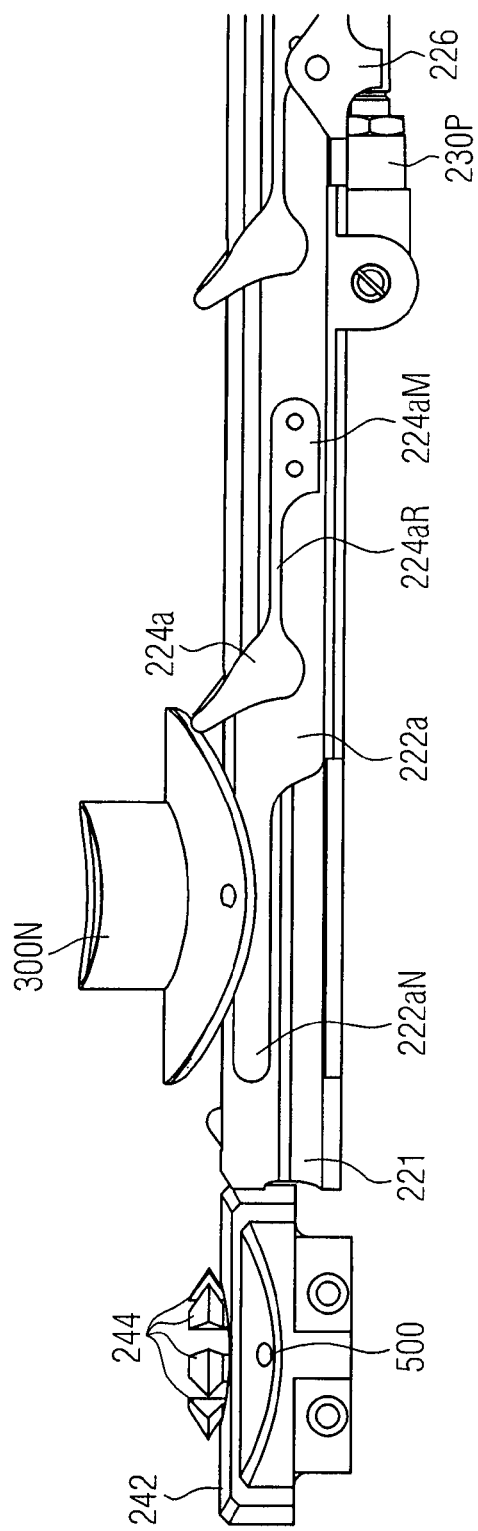
FIG. 11(a)
FIG. 11(b)

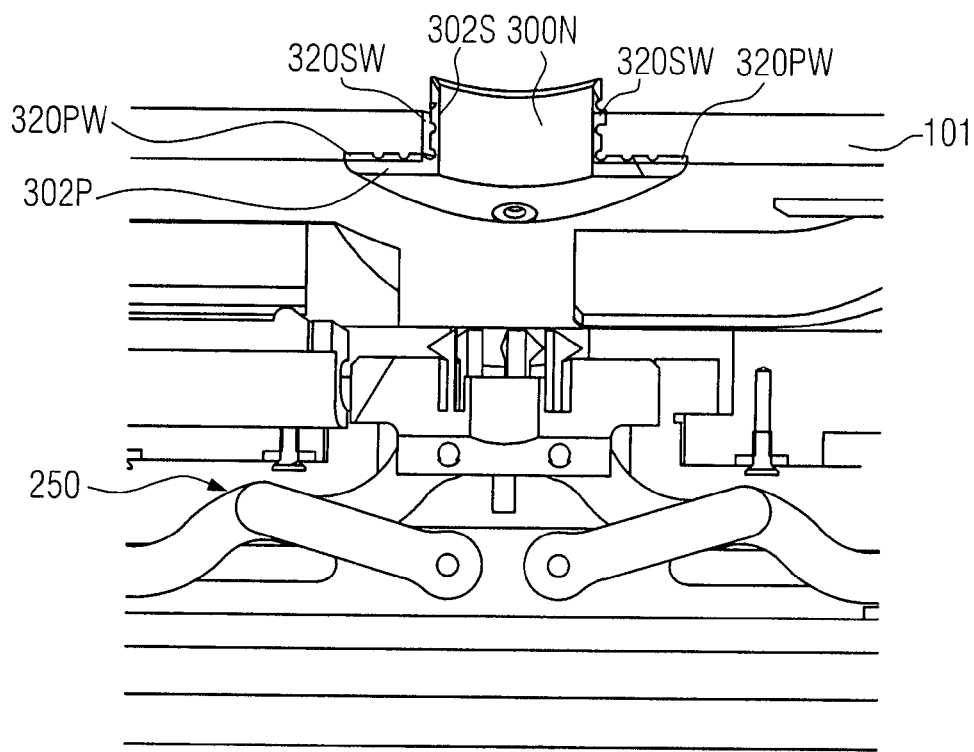
FIG. 17
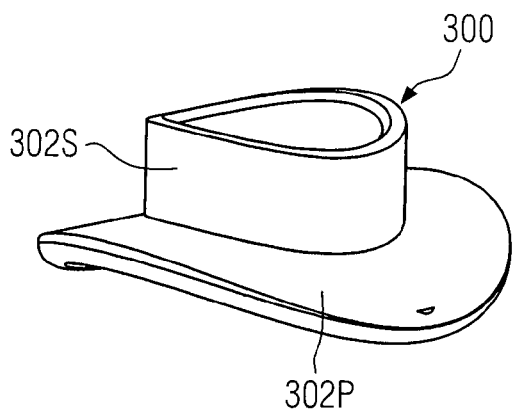 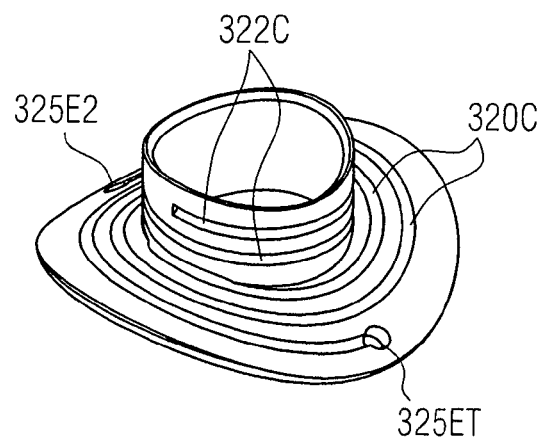
FIG. 18(a)  FIG. 18(b)

APPARATUS AND METHOD FOR INSTALLING A CONNECTION FITTING INTO A MAIN PIPELINE

TECHNICAL FIELD

This invention relates to pipelines, especially but not exclusively to apparatus for use in the maintenance or installation of pipelines. More particularly, though not exclusively, the invention relates to apparatus for use in the making of a service connection to a pipeline.

BACKGROUND OF THE INVENTION

Maintenance, upgrading and replacement of ageing utilities pipeline infrastructures are major issues facing utilities companies such as water and gas utilities companies. Pipeline networks typically include main supply pipelines (also referred to as the "mains" supply) and consumer service connection pipelines. (A "pipeline" or "pipe" may alternatively be termed simply a "conduit", and as used herein such terms may be used interchangeably.) The consumer service connection pipelines are connected to the main supply pipelines typically by means of a T-connection, to deliver a supply of fluid such as water or gas to a consumer's premises from the main supply pipeline via the consumer service connection pipeline.

Utilities supply pipelines and the connections between main and consumer service connection pipelines are typically located underground, presenting substantial access problems and cost implications when maintenance, upgrading or replacement is required.

Ageing pipelines, of both main and consumer connection types, are also vulnerable to failure and leakage of fluid from pipelines is a known hazard, which can be particularly serious in the case of gas leakage.

One solution to reducing the cost of replacement of pipelines, both of mains and consumer service connection kinds, is to install replacement pipeline within pre-existing pipeline, leaving the pre-existing main and/or pre-existing consumer service connection pipeline in place. The replacement main pipeline has an external diameter that is smaller than the internal diameter of the pre-existing main pipeline, allowing it to fit within the pre-existing main pipeline infrastructure. Similarly, the replacement consumer service connection pipeline has a diameter that is smaller than the pre-existing consumer service connection pipeline. The replacement main pipeline may be referred to as a "main pipeline liner" or "mains liner" because it effectively lines the pre-existing main pipeline. Similarly, the replacement consumer service connection pipeline may be referred to as a "service connection liner" since it effectively lines the pre-existing consumer service connection pipeline. The consumer service connection pipeline may for example be of the Serviflex® type, this being a twin-walled corrugated flexible polyethylene liner pipe supplied by Radius Systems Ltd, of South Normanton, Alfreton, Derbyshire, UK.

In known methods of replacement main pipeline installation, the replacement pipeline is installed within the pre-existing pipeline by pulling the replacement pipeline through the pre-existing pipeline. Connection of the consumer service connection pipeline (or even a replacement liner inserted therein to repair same) into the replacement main pipeline is made by excavating ground above the location at which the pre-existing service connection pipeline connects to the pre-existing main pipeline. Installation personnel then remove a portion of the pre-existing main pipeline and pre-existing service connection pipeline in order to expose the replacement pipelines that have been installed therein. A T-connector is then installed on the replacement main pipeline and the replacement service connection pipeline coupled to the replacement main pipeline via the T-connector. The T-connector is typically attached to the main pipeline by forming an electrofusion bond between the T-connector and the main pipeline in a known manner.

Connections into the new main pipeline of existing or replacement side (or branch) connection pipelines of other types, apart from those to consumers' properties, may be made in the same manner.

In methods of installing a replacement pipeline within a pre-existing pipeline, especially a main pipeline, it is frequently necessary to utilise an apparatus, often a remote-controlled apparatus such as a "pig" or "robot", that is insertable into and propellable along the main pipeline in order to carry out one or more operations on an inner wall thereof. Such operations may include for instance a cutting operation, e.g. a drilling operation for the purpose of forming a hole or aperture through the main pipeline wall in order to make a necessary service connection thereto, or an insertion operation, e.g. for inserting a connector device (such as the above-mentioned T-connector) or other fitting into the aperture thus formed, or a welding operation, e.g. to form a fluid-tight bond and seal between such newly installed components for completing the overall new service connection to the replacement main pipeline.

Such "pigs" or "robots" are often designed to be as small and lightweight as possible, and to that end it is common practice to provide such apparatuses with a multi-strand or multi-tube tether or umbilical cable via which it is linked to an above-ground control station and sources of electrical power, operational control signals, supplies of pressurised fluid to onboard pneumatic and/or hydraulic systems, and suchlike and provided. Such pigs or robots may also comprise several different sections or modules, e.g. each being constructed, designed and controlled to perform a given unique operation in the overall pipeline replacement procedure.

In practice however it is difficult to design such pigs or robots which are able to carry out particular dedicated tasks with efficiency and accuracy, in particular for example in terms of being controllable so as to be able to insert T-connectors or other fittings in pre-drilled apertures in an inner pipeline wall at the required locations and with stability and precision, and so as to form secure and efficient joints for completing the overall new service connection to the replacement main pipeline. Indeed, known attempts at providing such apparatus have hitherto failed to successfully address such shortcomings.

It is an aim of the present invention to address disadvantages associated with the prior art such as those discussed above.

SUMMARY OF THE INVENTION

Embodiments of the invention may be understood with reference to the appended claims.

Aspects of the present invention provide an apparatus or robot, a module for an apparatus or robot, a system and a method.

In one aspect of the invention for which protection is sought there is provided apparatus for installing a connection fitting into an aperture formed in a wall of a main pipeline in the making of a service connection between a side connection pipeline and the main pipeline, wherein the apparatus comprises:

propulsion means for propelling the apparatus along the main pipeline to a site at which the service connection is to be made; and installation means for installing, from within the main pipeline, at least a portion of the connection fitting into the aperture.

In embodiments, and in the disclosure which follows, the above apparatus may alternatively be termed a "robot".

In embodiments, and in the disclosure which follows, the above side connection pipeline may alternatively be termed a side connection conduit, or even may be referred to as a side connection liner. This is particularly since in embodiments of the invention, as an alternative to the service connection being made between an existing side connection pipeline itself and the main pipeline, it may optionally be that the service connection is to be made to the main pipeline via a replacement conduit or liner inserted into the existing side connection pipeline in a similar manner to the insertion of the main replacement conduit or liner into the main pipeline itself. Thus, both options for the identity of the side connection pipeline itself or a replacement conduit/liner therein, between which and the main pipeline the service connection is to be made, are possible within the scope of the present invention.

In another aspect of the invention for which protection is sought there is provided an installation module for an apparatus for making a service connection between a side connection pipeline and a main pipeline, the apparatus being propellable along the main pipeline to a site at which the service connection is to be made, and the installation module being constructed and arranged for installing a connection fitting into an aperture formed in a wall of the main pipeline, wherein the installation module comprises:

installation means for installing, from within the main pipeline, at least a portion of the connection fitting into the aperture.

In another aspect of the invention for which protection is sought there is provided a system for installing a connection fitting into an aperture formed in a wall of a main pipeline in the making of a service connection between a side connection pipeline and the main pipeline, wherein the system comprises:

a robot which is propellable along and within the main pipeline to a site at which the service connection is to be made, the robot comprising:

installation means for installing, from within the main pipeline, at least a portion of the connection fitting into the aperture;

and wherein the system further comprises control means for controlling actuation and operation of the robot or one or more components thereof.

In another aspect of the invention for which protection is sought there is provided a method of installing a connection fitting into an aperture formed in a wall of a main pipeline in the making of a service connection between a side connection pipeline and the main pipeline, the method comprising:

providing an apparatus according to the first aspect of the invention or any embodiment thereof;

inserting the apparatus into the main pipeline and propelling it therealong to a site at which the service connection is to be made;

operating the installation means to install, from within the main pipeline, at least a portion of the connection fitting into the aperture.

Embodiments of the invention in its various aspects may be applied to the making of a wide variety of service connections between a main pipeline and various types of side connection pipelines. Such side connection pipelines may be any of various branch connections which lead into the main pipeline, such as one or more lateral or take-off connection pipelines, or (especially) one or more consumer service connection pipelines which are used to deliver a utility conveyed by the main pipeline to a consumer's property. Moreover, as used herein, although the term "main pipeline" is used herein to refer to the pipeline in which the apparatus or robot is deployed, it is to be understood that this "main pipeline" may not necessarily be a "mains" pipeline as such, but may be any pipeline designated as a "main" pipeline by virtue of the fact that it is that pipeline, e.g. any pipeline of a pipe network or system, into which the apparatus or robot is inserted and deployed for the performance therein of its various intended operations and tasks from therewithin.

In many practical embodiments of the invention the installation of the connection fitting may be preceded by a step of forming the said aperture in the wall of the main pipeline at the site at which the service connection is to be made, into which aperture the at least a portion of the connection fitting is to be installed. Such an aperture may in particular may be formed at a location facing or adjacent a mouth or exit of the side connection pipeline to which the service connection is to be made. Such an aperture may for example be pre-formed by an earlier stage in the overall process of making the service connection and/or by operation of another module of the overall apparatus which is designed and dedicated for that purpose.

In some embodiments of the invention the installation means may comprise:

(i) a storage device for storing at least one connection fitting intended for installation;

(ii) a conveyance device for conveying a connection fitting to be installed from the storage device to an installation location; and (iii) an insertion device for inserting the connection fitting conveyed to the installation location from the installation location into the aperture formed in the wall of the main pipeline.

In some of the above embodiments of the invention the storage device may be constructed and arranged for storing at least one, preferably a plurality of, connection fittings in a sequential series or array. The storage device may be constructed and arranged such that a connection fitting located at a head of the said sequential series or array is that connection fitting intended next to be installed. In some embodiments the storage device may be constructed and arranged such that that connection fitting intended next to be installed, or even only that one connection fitting intended next to be installed, is able to be acted on by the conveyance device for conveying it to the installation location.

In some embodiments the sequential series or array of stored connection fittings may be arranged in the storage device longitudinally, such as in a linear longitudinal arrangement, relative to a general longitudinal direction of the apparatus. In some embodiments the storage device may comprise a storage rack for storing the said at least one, preferably plurality of, connection fittings thereon or therein. The rack may for example be carried on, or may be formed by, part of a chassis of the apparatus. In some embodiments the rack may comprise retaining means, such as in the form of one or more clips, detents, or other retaining devices, for retaining the or each connection fitting thereon until it becomes that one at the head of the said sequential series or array and next intended to be installed.

Any suitable number of connection fittings may be stored in the storage device and/or in the said series or array, for example depending on the number of connection fittings needed or desired to be available for installation in any given series or group of sequential installation operations without re-loading of the storage device with connection fitting(s) once the existing one(s) has/have been installed. A maximum number of connection fittings able to be stored in the storage device at any one time may also be dependent on, and limited by, the dimensions, especially the longitudinal dimensions, of the storage device, e.g. the above-mentioned rack, and/or an installation module itself that comprises the installation means.

One or more example forms of storage device within the scope of embodiments of this invention will be described hereinbelow in the context of some example embodiments of the invention in its various aspects described with reference to the accompanying drawings.

In some of the above embodiments of the invention the conveyance device may comprise a translating device for translationally conveying at least the fitting next to be installed from the storage device to the installation location. In some embodiments the translating device may be constructed and arranged for conveying incrementally in the direction of the installation location all the connection fittings stored in the storage device, such that upon each incremental translational movement a sequential connection fitting in the series or array becomes the next one conveyed to the installation location ready for installation. The installation location may be a portion, e.g. an upper portion, especially an upper lifting portion, of an installation pad or platform. In some embodiments the installation pad or platform may be a component or part of the insertion device, or alternatively it may be a component of the storage device which is acted upon by the insertion device.

In some embodiments the translating device may comprise at least one reciprocatable loading member arranged for reciprocating movement, especially linear reciprocating movement, relative to the storage device, and at least one engagement member carried on the or a respective loading member for engagement with a respective connection fitting, especially a loading side, edge or portion of a respective connection fitting, to be conveyed in the direction of the installation location, said engagement being such as to convey, upon movement of the or the respective loading member in a loading direction, the said respective connection fitting towards the installation location, e.g. the aforementioned installation pad or platform.

In some embodiments the translating device may comprise a pair of such reciprocatable loading members, e.g. in the form of a pair of symmetrically arranged side plates or members, located to respective opposite lateral sides of the storage device and moveable together in like reciprocating movement, especially linear reciprocating movement, relative to the storage device, with each loading member carrying thereon a respective one of at least one pair of engagement members for engagement with a respective loading side, edge or portion of the said respective connection fitting to be conveyed in the direction of the installation location, said engagement of the engagement members being such as to convey, upon movement of the pair of loading members in the loading direction, the said respective connection fitting towards the installation location, e.g. the aforementioned installation pad or platform.

In some such embodiments the or each reciprocatably moveable loading member (or pair thereof), with its (their) respective engagement member(s) carried thereon, may be constructed and arranged so as to be reciprocatably moveable, especially linearly reciprocatably moveable, relative to the storage device, between a retracted (or rearward) position and an advanced (or forward) position. Said linear movement may be generally parallel to a longitudinal length of the storage device carrying the series or array of connection fittings intended for installation.

In some such embodiments the or each loading member (or pair thereof), with its (their) respective engagement member(s) carried thereon, may be reciprocatably moveable, especially linearly reciprocatably moveable, under actuation and control of at least one pressurised fluid device, e.g. at least one pneumatic or hydraulic device, which may operate via fluid displacement from one or more cylinders or other reservoirs of the relevant fluid. Suitable such devices may include one or more devices operated by compressed air or a pressurised liquid, practical examples of which are well known in the art. In some practical example embodiments the necessary one or more cylinders or other reservoirs of the relevant pressurised fluid may be carried in or on the apparatus or robot itself, e.g. in the installation module itself or in a dedicated module of a modular apparatus or robot, of which the installation module of embodiments of the present invention may be another module, with appropriate connecting pipework, tubes or conduits as well as any necessary valve arrangements and/or pressure-regulating devices (for providing compressed fluid at an appropriate pressure to where it is needed) being provided internally of the overall modular apparatus or robot.

Accordingly, in some embodiments the constructional arrangement of the conveyance device may be such that:

(i) as the or a respective loading member is moved from its retracted (rearward) position towards its advanced (forward) position, i.e. in a loading direction, the or a respective engagement member assumes its engaging pivotal position so as to engage the said respective loading side, edge or portion of the said respective connection fitting that is associated with it, and thereby to convey it towards the said installation location, e.g. the aforementioned installation pad or platform, and (ii) as the or the respective loading member is moved subsequently from its advanced (forward) position towards its retracted (rearward) position, i.e. in a retractive direction, the or the respective same engagement member assumes its non-engaging pivotal position so as not to engage a subsequent or next-in-line connection fitting in the series or array in the storage device (and thus now a new connection fitting at the head of the sequential series or array in the storage device and so the next to be installed). Such an assuming of a non-engaging pivotal position may for example be by virtue of the shape or configuration of the respective engagement member causing it to be pivotally forced into its non-engaging position by the subsequent or next-in-line connection fitting in the series or array in the storage device as the respective engagement member passes thereby during its retractive movement in the retractive direction.

In this manner upon each repetition of the aforementioned movement of the or the respective loading member firstly in the loading direction, i.e. from its retracted (rearward) position towards its advanced (forward) position, and secondly (and subsequently) in the reverse, retractive direction from its advanced (forward) position towards its retracted (rearward) position, the series or array of connection fittings loaded onto the storage device is incrementally advanced towards the installation location, with a new one such connection fitting becoming that at the head of the series or array in the storage device upon each successive reciprocation of the arrangement after each respective connection fitting has been installed.

In some embodiments the pivotal movement of the or each respective engagement member between its engaging and non-engaging positions may be by virtue of it being mounted, relative to the storage device, via a pivotal, e.g. a rotational mounting. Alternatively the said pivotal movement of the or each respective engagement member may be by virtue of the or the respective engagement member being mounted relative to the storage device via a mounting arm which is resiliently deformable, e.g. by virtue of being made of a resiliently deformable material.

In some embodiments, during movement of the or the respective loading member(s) in the rearward, retractive direction, any tendency for the connection fittings in the series or array in the storage device to move in the same rearward, retractive direction, relative to a bed of the storage device on which they are carried, may be substantially prevented or resisted by the provision on or in the storage device of one or more respective anchoring tabs, e.g. one or more respective anchoring tabs protruding from the bed of the storage device carrying the connection fittings, each being configured to engage the loading side, edge or portion of a respective connection fitting during said rearward, retractive movement of the or the respective loading member(s). Thus, such one or more anchoring tabs may serve to substantially prevent any longitudinal relative movement between the connection fittings in the series or array in the storage device and the bed of the storage device itself except for when the or the respective loading member(s) move, relative to the storage device, in the loading direction.

One or more example forms of conveyance device within the scope of embodiments of this invention will be described hereinbelow in the context of some example embodiments of the invention in its various aspects described with reference to the accompanying drawings.

In some of the above embodiments of the invention the insertion device may comprise a displacement device constructed and arranged for advancing and/or retracting a, or the above-mentioned, installation bed or platform into and/or from an insertion relationship with the aperture in the wall of the main pipeline. The displacement device may for example be constructed and arranged for advancing and/or retracting the installation bed or platform in a direction generally transverse to a longitudinal axis of the main pipeline. As the displacement device is actuated to move the installation bed or platform in the direction of its advanced position, so a connection fitting located on the installation bed or platform is insertable into the aperture formed in the wall of the main pipeline.

As used in this context, the terms "longitudinally" and "longitudinal", and variants thereof in the same context, with respect to the main pipeline mean generally or approximately parallel to the longitudinal axis of the main pipeline, in particular at or adjacent the particular location or region within the main pipeline to which the term is being applied. The terms "generally transverse" and "generally transversely", and variants thereof in the same context, as used herein with respect to directions relative to the longitudinal axis of the main pipeline, mean generally or approximately perpendicular to the main pipeline longitudinal axis at or adjacent the particular location or region therewithin to which the term is being applied. Moreover, this meaning of the terms "generally transverse" and "generally transversely" is intended to be construed broadly and to encompass directions at angles either side of 90°, e.g. up to around 10 or 20 or 30 or 40 or 50 or 60 or 70 or 80° either side of 90°, with respect to the main pipeline longitudinal axis at or adjacent the particular location or region therewithin to which the term is being applied.

In the practising of some practical embodiments of the method aspect of the invention, the step of actuating the insertion device of the installation means may additionally comprise a preliminary step of aligning the installation bed or platform, especially the installation bed or platform carrying a connection fitting thereon which has been conveyed thereto from the storage device by the conveyance device, with the said aperture in the main pipeline wall. Such an alignment step may, in some embodiments of the invention, be facilitated by the provision in or on the insertion device and/or elsewhere in or on the installation means, and/or even elsewhere in or on the installation module or apparatus or robot itself, one or more positioning or locator devices for positioning or locating or orienting the installation means, or the installation module or apparatus itself, at a required or desired location and/or position and/or orientation in the main pipeline at or in which access to the aperture formed in the main pipeline wall is possible for installation of the connection fitting therein. Such positioning or locator device(s) may comprise for example one or more cameras, e.g. optical or even IR cameras, for observing the pipeline interior and/or the module's or apparatus's environment.

In some embodiments the displacement device may comprise a scissor lift mechanism, especially a scissor lift mechanism constructed and arranged for selectively advancing or retracting, especially upon actuation of actuation means and under control of control means, the installation bed or platform in the transverse direction relative to the longitudinal axis of the main pipeline. Accordingly, with a connection fitting located on the installation bed or platform, it having been conveyed from the storage device into the installation location thereon by the conveyance device, as the scissor lift mechanism is actuated and controlled to move the installation bed or platform transversely in the direction of its advanced position, i.e. to advance the installation bed or platform towards the aperture pre-formed in the main pipeline wall, so the connection fitting is inserted into the aperture.

In some embodiments the scissor lift mechanism may be operated by one or more appropriately actuatable and controllable pressurised fluid devices, e.g. one or more pneumatic or hydraulic devices, which may operate via fluid displacement from one or more cylinders or other reservoirs of the relevant fluid. Suitable such devices may include one or more devices operated by compressed air or a pressurised liquid, practical examples of which are well known in the art. In some practical example embodiments the necessary one or more cylinders or other reservoirs of the relevant pressurised fluid may be carried in or on the apparatus or robot itself, e.g. in the installation module itself or in a dedicated module of a modular apparatus or robot, of which the installation module of embodiments of the present invention may be another module, with appropriate connecting pipework, tubes or conduits as well as any necessary valve arrangements and/or pressure-regulating devices (for providing compressed fluid at an appropriate pressure to where it is needed) being provided internally of the overall modular apparatus or robot.

As with the above-mentioned provision of onboard pressurised fluid supply(ies) for operation of the above-defined one or more loading member(s) of the conveyance device, this arrangement for onboard pressurised fluid supply(ies) for the insertion device likewise may avoid the need, as is often found with prior art apparatuses, to provide a source of the pressurised fluid as an element of a tether or umbilical cable linking the apparatus or robot to a ground-based control station. By placing the supply of the pressurised fluid onboard the apparatus or robot, it may thus be possible to improve response times and/or actuation or operational speeds of the relevant one or more pneumatic- or hydraulic-operated, devices used to effect and control movement of the relevant mechanisms within the installation means. Furthermore, it may also enable a reduction in size, weight, and complexity of any tether or umbilical cable that is employed to provide power, control signals and/or other services to the apparatus or robot from ground level whilst the apparatus or robot is within the pipeline.

In practical implementation of such embodiments as above, there may be provided externally of the apparatus charging means, or filling or replenishing or loading means, for charging the one or more pressurised fluid supply reservoirs, preferably from a general source thereof outside the apparatus, especially from ground level, e.g. whilst the apparatus is present within the pipeline. Such charging means may be substantially permanently linked to the apparatus, e.g. via an element of the tether or umbilical cable, so as to enable the one or more reservoirs to be charged as or when required whilst the apparatus remains within the pipeline, or alternatively (and in a possibly more preferred arrangement) such charging means may not be permanently linked to the apparatus such that the or the respective reservoir may be rechargeable or refillable only when the apparatus is removed from the pipeline, e.g. upon completion of a particular operation or series of operations, for which a single charge or fill of pressurised fluid is sufficient. This may thus avoid the need for a permanent fluid supply connection from a ground supply source to the apparatus, which may thereby circumvent typically disadvantageous consequences of poor flow characteristics associated with small diameter tubing, which typically is needed for any fluid connection embodied in a tether or umbilical cable.

In some embodiments the scissor lift mechanism which advances or retracts the installation bed or platform towards or away from the aperture in the main pipeline wall as or when required, may comprise a scissor frame which carries the installation bed or platform, and one or more actuation means, especially pressurised fluid actuation means, which act on the scissor frame to advance or retract, as the case may be, the installation bed or platform in the transverse direction.

In some example forms, the scissor frame may comprise at least one pair, preferably at least two pairs of, elongate frame members pivotally attached to one another. In the or each pair:

a primary frame member may be pivotally attached at a first end thereof to the installation bed or platform, e.g. to an underside thereof (i.e. a side thereof opposite that which carries the connection fitting during the insertion procedure), and pivotally attached at a second, opposite, end thereof to a or a respective pressurised fluid device for movement of that opposite end in a longitudinal direction; and a secondary frame member may be pivotally attached at a first end thereof to the primary frame member intermediate its first and second ends, and pivotally attached at a second, opposite, end thereof to a fixed location relative to the scissor frame and the pressurised fluid device(s), such as a or a respective anchoring point on a chassis of the insertion device or module or apparatus itself;

whereby actuation of the or the respective pressurised fluid device in the said longitudinal direction causes scissoring pivotal relative movement of the frame members and consequently the installation bed or platform to be displaced in the said transverse direction.

In one example form, two respective pressurised fluid devices are provided, each one being actuatable on a respective second end of a respective primary frame member in a longitudinal direction opposite to the longitudinal direction in which the other of the said pair of pressurised fluid devices acts on the respective second end of the other respective primary frame member, with the two pairs of frame members being oriented inversely relative to one another. In this manner a symmetrical scissoring motion of the two pairs of symmetrically arranged frame members may occur.

In such embodiments the two pressurised fluid devices may be supplied from a common pressurised fluid source, and may even employ a single common piston and cylinder arrangement to generate the required longitudinal forces to move the respective scissor frame members. To this end, the pressurised fluid device arrangement may comprise a primary slidable piston portion actuatable by the pressurised fluid cylinder in a first longitudinal direction, and a secondary slidable piston portion actuatable by the primary piston portion in a second longitudinal direction, the second piston portion being linked to the primary piston portion via a rack and pinion device which reverses the resultant longitudinal directions in which each piston portion travels. Thus, the primary piston portion, which acts on the primary frame member of one of the pairs thereof, and the secondary piston portion, which acts on the primary frame member of the other of the pairs thereof, are actuatable, via the rack and pinion mechanism, to move in opposite longitudinal directions, thereby causing the respective pairs of frame members to move in a scissoring fashion symmetrically either side of the said transverse direction and thus to cause the installation bed or platform attached to the respective first ends of the primary frame members of the two pairs thereof to be either advanced or retracted in the said transverse direction, depending on the direction of longitudinal movement initiated by the primary piston portion of the pressurised fluid device.

One or more example forms of insertion device, including one or more example forms of the above scissoring displacement device, within the scope of embodiments of this invention will be described hereinbelow in the context of some example embodiments of the invention in its various aspects described with reference to the accompanying drawings.

In some embodiments, in which the installation location is the aforementioned installation pad or platform, means may be provided for preventing the insertion device lifting (i.e. advancing in an insertion direction) the installation pad or platform except for when a next connection fitting to be installed has already been appropriately placed thereon by the conveyance device. Such means may for example be constituted by, or comprise, a respective nose or extension portion of each of the above-mentioned loading members, which respective nose or extension portions are configured so as to engage or overlie a portion of the installation pad or platform so as prevent lifting movement thereof when the respective loading member is in at least its maximum advanced (forward) position, relative to the storage device.

In some of the above embodiments of the invention there may additionally be provided, for example as part of the storage device or as an independent component of the installation means itself, moveable cover means for selectively retaining, e.g. by covering one or more portions of, a connection fitting located on the installation pad or platform, once conveyed into its location thereon and ready for insertion by the insertion device, in place thereon, at least until such time as the insertion device is actuated. This may serve to prevent the connection fitting from falling off the installation pad or platform before the insertion device is actuated, for example in the event that the transverse insertion direction is not generally substantially vertically upward. In such embodiments the cover means may for example comprise a cover plate or shroud slidably movable between a covering or retaining position, in which it engages or retainingly covers one or more portions of the connection fitting located on the installation pad or platform, and a non-covering or non-retaining position, in which it does not engage or retainingly cover the said portion(s) of the connection fitting located on the installation pad or platform. In embodiments the cover means may be selectively moveable under actuation and/or control of respective pressurised fluid device, of a similar construction and/or operation to those used to actuate and/or control other components of the apparatus, e.g. those mentioned above.

In some embodiments of the invention there may be additionally be provided, optionally as part of the installation means, at least one welding device for effecting, from within the main pipeline, one or more welding and/or sealing operations in the installation of the connection fitting. Such one or more welding and/or sealing operations may generally be carried out subsequent to the insertion of the connection fitting into the aperture in the main pipeline wall, in order to complete the making of a secure and fluid-tight service connection to or from the main pipeline via the connection fitting inserted in the aperture in the wall thereof.

In some practical embodiments, once a relevant connection fitting has been inserted into a respective aperture in the main pipeline wall, but before a respective weld connection has been made to it, the connection fitting itself may be held in place in the aperture for example by virtue of a simple friction or interference fit. Optionally, one or more barbs, protrusions or other engagement elements may be provided e.g. on the exterior of the connection fitting (or at least a central channel portion thereof) for engagement with the interior wall(s) of the aperture, to facilitate the retention of the fitting therein.

In some embodiments the or a respective welding device may be constructed and configured for forming at least a primary weld joint, and optionally also a primary seal, between a primary connector portion of a connection fitting already inserted into the aperture in the main pipeline wall at the site at which the service connection is to be made, and the main pipeline wall, especially a portion thereof adjacent or surrounding the aperture therein into which the connection fitting has been inserted.

In such embodiments the or the respective welding device may additionally, or another respective welding device may, be constructed and configured for forming at least a secondary weld joint, and optionally also a secondary seal, between a terminal end of the side connection pipeline, or a terminal end or end portion of a side connection conduit/liner inserted into the side connection pipeline in an earlier step in the overall procedure for the making of the service connection, and a secondary connector portion of the connection fitting already inserted into the aperture in the main pipeline wall at the site at which the service connection is to be made.

In embodiments the primary connector portion of the connection fitting may for example comprise an annular or peripheral flange or web, which may be continuous or discontinuous, which surrounds a central channel portion of the connection fitting which is that part which actually extends through the said aperture in the main pipeline wall upon installation of the fitting therein. The annular or peripheral flange or web may thus usefully be configured for abutting the inner wall of the main pipeline adjacent and/or surrounding the aperture. The secondary connector portion of the connection fitting may for example comprise a terminal channel portion, distal from the first connector portion, and optionally being a continuation of the central channel portion, to which the terminal end of the side connection pipeline (or a terminal end or end portion of a side connection conduit/liner inserted therein) abuts or engages in a male-female relationship therewith, e.g. by an interference fitting.

In embodiments such primary and secondary weld connections and/or seals may be formed or effected either in sequential steps (either one before or after the other) or optionally substantially simultaneously.

Any suitable type of welding device may be used in the above embodiments. One especially useful such welding device may be an electrofusing apparatus, comprising an electrofusing conductor embedded in the material, especially a fusible plastics material, of the connection fitting, and an electrical connector provided on the installation means and arranged to selectively supply electric current to the embedded conductor from the installation means, or some other component of the installation module or apparatus/robot, to melt the connection fitting material at the appropriate location(s) to form the required primary and/or secondary weld(s) and/or seal(s) between the respective parts once they have been brought into mutual contact or abutment or engagement.

One or more example forms of connection fitting per se, within the scope of—or for use in combination with—embodiments of this invention will be described hereinbelow in the context of some example embodiments of the invention in its various aspects described with reference to the accompanying drawings.

Accordingly, in another aspect of the invention for which protection is sought there is provided, in combination:
  (i) an installation apparatus or module for installing a or a respective connection fitting into a or a respective aperture formed in a wall of a main pipeline in the making of a or a respective service connection between a or a respective side connection pipeline and the main pipeline, wherein the apparatus or module comprises:
    propulsion means for propelling the apparatus or module along the main pipeline to a site at which the or the respective service connection is to be made, and
    installation means for installing, from within the main pipeline, at least a portion of the or the respective connection fitting into the or the respective aperture; and
  (ii) at least one said connection fitting intended for installation in a respective said aperture.

In yet another aspect of the invention for which protection is sought there is provided a connection fitting per se for installation into an aperture formed in a wall of a main pipeline in the making of a service connection between a side connection pipeline and the main pipeline, wherein the connection fitting is constructed and configured for use with an installation apparatus, or an installation module, or an apparatus or robot, according to a respective other aspect of the invention or any embodiment of any thereof.

Embodiments of such a connection fitting per se may comprise for example a primary connector portion and a secondary connector portion such as any of these defined above, or any other one or more features of such a connection fitting as hereinbefore mentioned.

In general, embodiments of the present invention may be practised in the making of service connections between consumer service or any other side connection pipelines (or conduits/liners inserted therein) and main pipelines of a wide variety of respective diameters, e.g. particularly in the context of main pipelines having a diameter of 1 m or less, optionally in the range from about 10 mm to about 1 m. Some embodiments may be configured for operation in main pipelines having a diameter in the range from about 50 mm to about 200 mm, optionally from about 50 mm to about 100 mm, optionally in the range from about 75 mm to about 90 mm.

In many practical embodiments of the invention the overall apparatus or robot, of which the installation apparatus or module may form just one component or module, may comprise a plurality of operational modules, e.g. arranged longitudinally or sequentially in the overall apparatus or robot, each module comprising an operational device for performing a given respective task or operation on or in the main pipeline, with one of the said modules being an installation module comprising the installation means which underpins the present invention.

By way of example, such operational modules may be constructed, arranged and/or configured for carrying out any of the following operations (which list is to be considered as non-exhaustive):

a moving or drive operation, e.g. for moving the apparatus with respect to one or more walls of the pipeline, e.g. for propelling the apparatus along the pipeline or manoeuvring or aligning it (e.g. rotating it about the longitudinal axis of the pipeline and/or moving it longitudinally) therewithin into a desired positon for performing one or more other operations;

a surveying operation, e.g. for observing or detecting a particular condition of or location in the pipeline in order to diagnose or prepare for one or more other operations;

a drilling operation, e.g. for drilling a hole or aperture (of any shape) in a wall of the pipeline for the purpose of forming a service connection, such as a consumer utility service connection (or some other side or branch connection) thereto, or for part drilling- or cutting-through the pipeline wall or for bevelling, chamfering, de-burring or other shaping or finishing of one or more edges of a hole or aperture formed in the pipeline wall;

a connection fitting installation operation, in particular that according to embodiments of the present invention, for physically inserting and installing one or more connection fittings into a or a respective aperture in the pipeline wall formed by a drilling operation;

a consumer service connection (or any other type of side or branch connection) liner insertion operation, for engaging a side connection conduit/liner from within the main pipeline and drawing or pushing the side connection conduit/liner through the side connection pipeline by traction and into position for completing a service connection to the main pipeline, e.g. by welding;

a welding and/or sealing operation, e.g. for completing a connection fitting installation operation and/or a side connection liner insertion operation, or effecting a repair or service connection operation;

a repair operation, e.g. for repairing a wall of the pipeline or a service connection thereto;

a testing operation, e.g. for pressure-testing a pipeline subsequent to an insertion, welding or repair operation;

a cleaning operation, e.g. for cleaning an internal wall or surface of the pipeline or clearing debris or waste material from within the pipeline, including swarf from a drilling or other cutting operation.

Actuation of the one or more operational devices in any such apparatuses or modules, including the various operational components of the installation means of the installation apparatus or module according to embodiments of the present invention, may be effected by any suitable actuation means, preferably under control of control means, for example part of an overall control system of the apparatus or system. Such control means may be located at least partly on or in the apparatus itself, or it may be located at least partly at ground level and connected to the apparatus via a tether or umbilical cable.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example, features described in connection with one embodiment are applicable to all embodiments, unless expressly stated otherwise or such features are incompatible.

For the avoidance of doubt, it is to be understood that features described with respect to one aspect or embodiment of the invention may be included within any other aspect or embodiment of the invention, either alone or in appropriate combination with one or more other features.

BRIEF DESCRIPTION OF THE DRAWINGS

One or more embodiments of the invention in its various aspects will now be described, by way of example only, with reference to the accompanying drawings, in which:

FIGS. 11(a) and 11(b) are enlarged front side views of the same portion of the conveyance device as shown in FIG. 7, but showing respectively successive stages in the conveying of a connection fitting from the storage device towards the installation bed or platform and illustrating the operation of the loading members and associated engagement members;

FIG. 17 is a close-up cross-sectional, part-cut-away, view of the same arrangement as shown in FIGS. 15 and 16, but showing the connection fitting having now been inserted into the aperture in the pipeline wall and the scissor-lift-operated insertion device having been lowered and retracted;

FIG. 18(a) is a perspective external view of a connection fitting alone which is installable by use of embodiments of the invention; and FIG. 18(b) is an internal cut-away view of the connection fitting of FIG. 18(a), showing the internal arrangement of the internal electrofusing conductor which is embedded therein during its manufacture and used to effect the necessary welds and/or seals for completing the making of a fluid-tight service connection into the main pipeline.

DETAILED DESCRIPTION OF EMBODIMENTS

Figure 1:
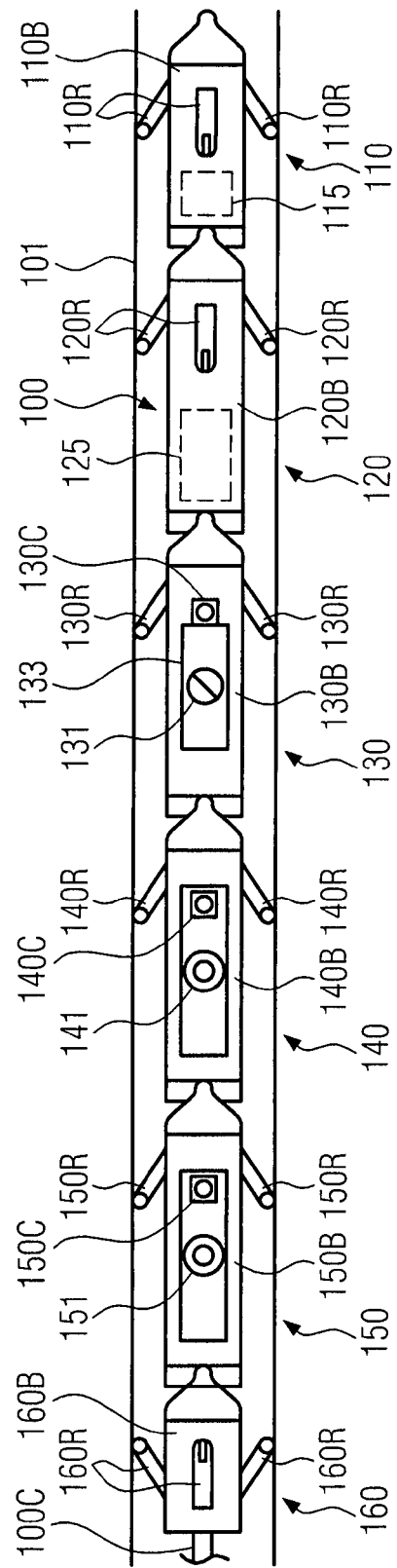
FIG. 1 is a plan view schematic illustration of a pipeline robot according to an embodiment of the present invention.
Figure 2:
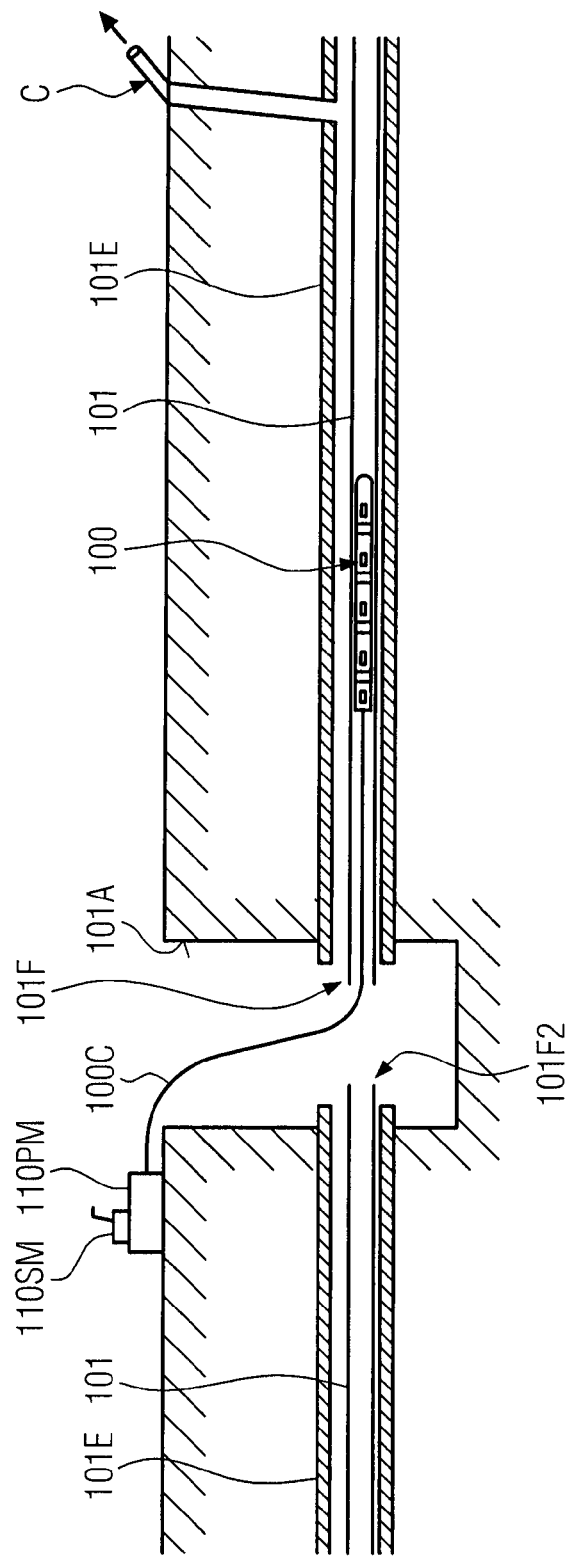
FIG. 2 is a cross-sectional view of a typical operating environment of a pipeline robot according to an embodiment of the present invention.

FIG. 1 is a plan view schematic illustration of a pipeline robot 100 located within a newly installed utilities main pipeline 101. An enlarged scale view of a typical operational environment of the robot 100 is shown in FIG. 2. It can be seen from FIG. 2 that, in the scenario illustrated, the robot 100 has been introduced into a newly installed main pipeline 101 via an underground inspection well 101A. The newly installed utilities main pipeline 101 is itself located within a pre-existing main pipeline 101E of larger diameter. It is to be understood that the free end 101F of the main pipeline 101 that is exposed to the well 101A may be coupled to the free end 101F2 of a second length of newly installed main pipeline 101 that also terminates in the well 101A once consumer service connection (or other types of side or branch connection) pipelines have been connected to the main pipeline 101.

At some point along the main pipeline 101 there is located a junction between the main pipeline 101 and one of any number of discrete consumer service (or other side or branch) connection pipelines C, via which junction fluid connection between the two pipelines is made to allow e.g. the consumer to enjoy the utility, e.g. water or gas etc, that is conveyed by the main pipeline 101. As can be seen from the scenario depicted in FIG. 2, having inserted a replacement main pipe or liner into the main pipeline, it is necessary to establish a service connection again between the interior of the new main pipeline 101 and the consumer service (or other side or branch) connection pipeline C. It is to this task, or one or more particular steps in this overall task, that embodiments of the present invention are particularly directed.

By way of one working example, the robot 100 is constructed and configured for forming a consumer service (or other side or branch) connection into the newly installed main pipeline 101, in particular by incorporation into the robot 100 of the requisite number and identity of individual modules each of which is constructed and configured for performing a dedicated task within the overall procedure. The robot 100 achieves this, in broadly defined terms, by the discrete steps of bringing itself into the required position within and with respect to the main pipeline at which the service connection is to be made, drilling an aperture in a sidewall of the main pipeline at the required location, installing a pipeline connection fitting or other connector into the aperture thus formed, optionally inserting a new or replacement consumer service (or other side or branch) connection pipe or liner into the existing consumer service (or other side or branch) connection pipeline, welding and/or sealing the new connection fitting or other connector both to the newly installed replacement consumer service (or other side or branch) connection pipe or liner (if provided, or if not, to the existing consumer service (or other side or branch) connection pipeline) and to the inner wall of the main pipeline adjacent or surrounding the aperture, testing the integrity of the newly made joints and/or seals in the newly made service connection, and finally cleaning up the site of the work by collecting debris and suchlike to leave the newly formed service connection junction and surrounding area clean and free for subsequent fluid passage of the relevant utility therethrough.

The robot 100 has six modules coupled to one another in series. In the embodiment shown in FIG. 1 the modules are a drive module 110, a drill module 120, a connection fitting installation module 130, a consumer service (or other side or branch) connection liner insertion module 140, a leak test module 150 and a trailer module 160. One or other of, or even both of, the connection fitting installation module 130 and consumer service (or other side or branch) connection liner insertion module 140 may incorporate a weld device for effecting the required weld(s) and/or seal(s) during the installation or insertion and connecting up of the respective connection fitting and consumer service (or other side or branch) connection liner (if used, or if not, and the existing consumer service (or other side or branch) connection pipeline). Alternatively an extra dedicated weld module may be provided in the overall robot 100 dedicated to this particular task.

In some embodiments one or more additional modules may be included in the robot 100 to fulfil or carry out one or more specific functions or tasks, for example a discrete pneumatic supply module which provides an onboard supply of pressurised pneumatic fluid for operating the various pneumatic devices in the robot 100.

Moreover the various modules within the robot 100 may be connected up in any desired or appropriate order, in particular so that adjacent modules are more efficiently connected or linked together, if that should be desirable.

Each module 110-160 has at least three support arms 110R, 120R, 130R, 140R, 150R, 160R that are configured to project outwardly therefrom at an acute angle with respect to a longitudinal axis of each module. The support arms 110R-160R pivot about an axis at a proximal end within a body portion 110E-160B of each module 110-160. Each arm 110R-160R is spring-loaded and carries a roller in the form of a wheel at its free end. The arms 110R-160R are configured to urge the respective rollers away from the body portion 110B-160B and against an inner wall of the pipeline 101 in order to support the modules 110-160 substantially coaxially of the pipeline 101. The spring loading of the arms 110R-160R assists the robot 100 to maintain a coaxial location whilst accommodating variations in diameter or cross-sectional shape of the pipeline 101, for example in regions that are not circular such as elliptical or other non-circular cross-sectional shape, and to negotiate bends in the pipeline 101. It is to be understood that maintaining a coaxial location is not necessarily critical in all applications.

In the embodiment as illustrated by way of example, the drive, drill and trailer modules 110, 120, 160 are shown each as having four support arms 110R, 120R, 160R arranged in quadrature about the longitudinal axis of the respective module. In the orientation shown in FIG. 1 one arm projects substantially vertically upwardly, one arm projects substantially vertically downwardly and two arms project substantially laterally in opposite directions. On the other hand, in the embodiment as illustrated by way of example, the connection fitting installation, consumer service (or other side or branch) connection liner insertion, and leak test modules 130, 140, 150 are shown each as having three support arms 130R, 140R, 150R, one arm projecting substantially vertically downwardly and two arms projecting substantially laterally in opposite directions in the orientation depicted in FIG. 1. Of course, any of the modules may have a different number and arrangement of support arms from that illustrated here, as may be desirable or more suitably appropriate for any given practical embodiment.

For example, in some alternative embodiments, one or more of the modules may have rollers that are attached to a body of the module rather than to spring-loaded arms. The rollers may be non-spring-loaded in some embodiments, being configured to rotate about an axis at a substantially fixed distance from a longitudinal axis of the respective module of which they form part. For example, one or more rollers may be provided such as wheels, caterpillar tracks or other suitable roller arrangements. The rollers may be arranged such that the robot 100 may crawl along the pipeline 101 with the rollers contacting only a lower internal surface area of the pipeline 101.

In the embodiment of FIG. 1 the rollers of the drive module 110 are configured to be driven by electric motors that are powered by means of an electrical powerline carried by an umbilical cable 100C. The umbilical cable 100C runs along the length of the robot 100 along a conduit provided through each module.

The drive module 110 also carries an onboard robot control portion 115. The onboard control portion 115 includes a computing device that is in data communication via a data line carried by the umbilical cable 100C with a main or primary interface module 110PM external to the pipeline 101 as shown schematically in FIG. 2. The primary interface module 110PM is connected to a secondary interface module 110SM which in the present embodiment is provided by a portable computing device having a keyboard and display screen. The secondary interface module 110SM allows a user to control the primary interface module 110PM to send electrical control and power signals, and supply compressed air or other pneumatic liquid at a required pressure, to the robot control portion 115. By means of the secondary interface module 110SM an operator may control the drive module 110 to cause the robot 100 to move in a forward and/or reverse direction within the pipeline 101 and to operate each of the drill module 120, connection fitting installation module 130, consumer service (or other side or branch) connection liner insertion module 140, leak test module 150 and trailer module 160 to carry out their dedicated individual tasks in the overall procedure for forming the new service connection into the newly installed main pipeline.

It is to be understood that, in the event the robot 100 becomes immobilised for any reason within the pipeline 101, the robot 100 may typically be retrieved by pulling on the umbilical cable 100C.

For brevity, the drill module 120, the consumer service (or other side or branch) connection liner insertion module 140, the leak test module 150 and the trailer module 160 will not, and need not, be described in further detail here, but it is to be understood that they may each have any appropriate or desired construction, configuration and operation as required of the apparatus or its intended use, either in terms of known or novel principles and/or features.

However, for the purpose of the present invention reference is now made to FIGS. 3 to 18, which illustrate the construction and operation of an embodiment of the connection fitting installation module 130 which may form this particular module of this, or indeed other, embodiments of robot within the scope of this invention.

Figure 3:
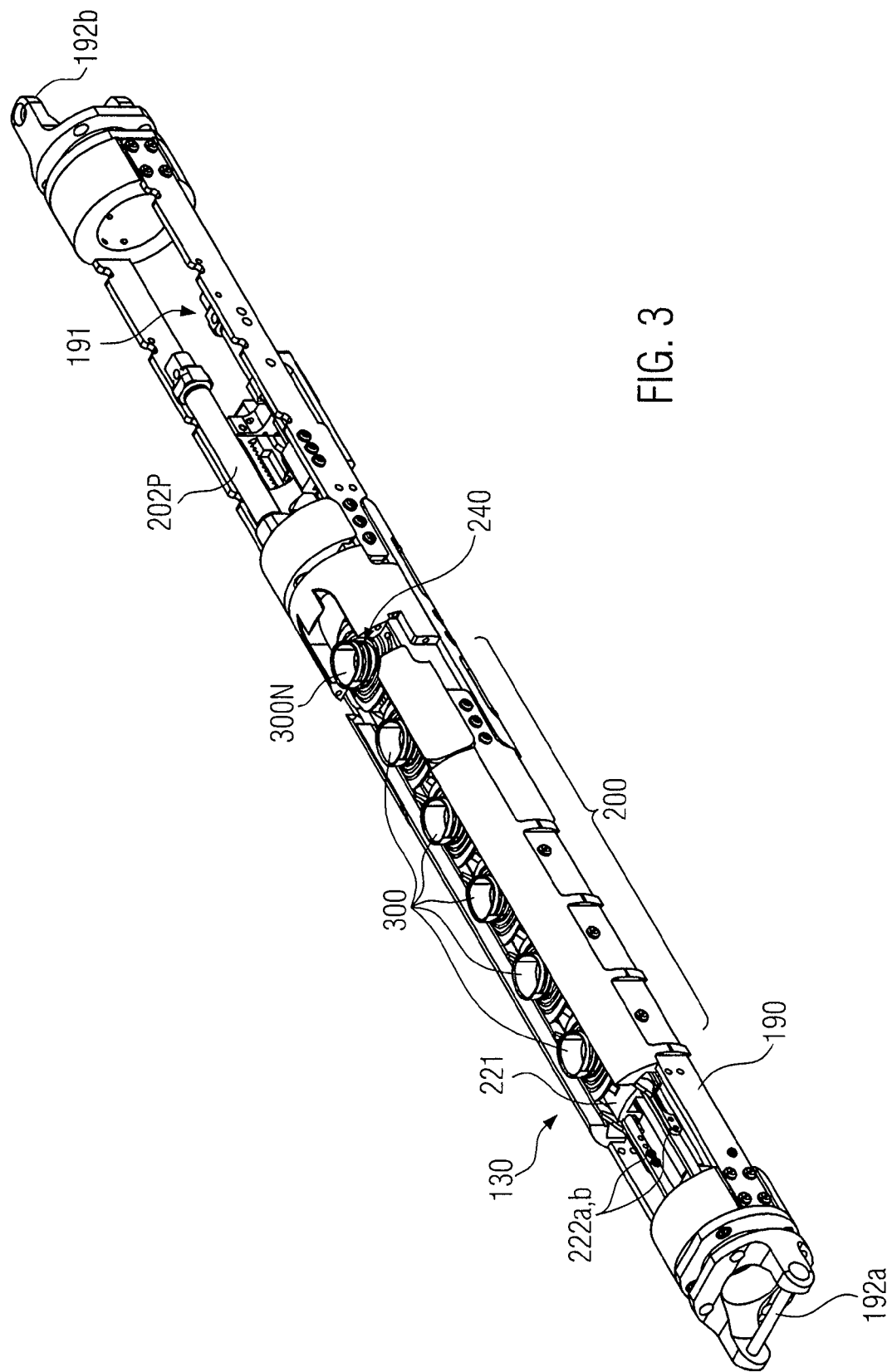
FIG. 3 is a perspective view of a complete connection fitting installation module, forming part of the pipeline robot of FIG. 1, according to an embodiment of the invention, shown loaded with a supply of connection fittings ready for installation.
Figure 4:
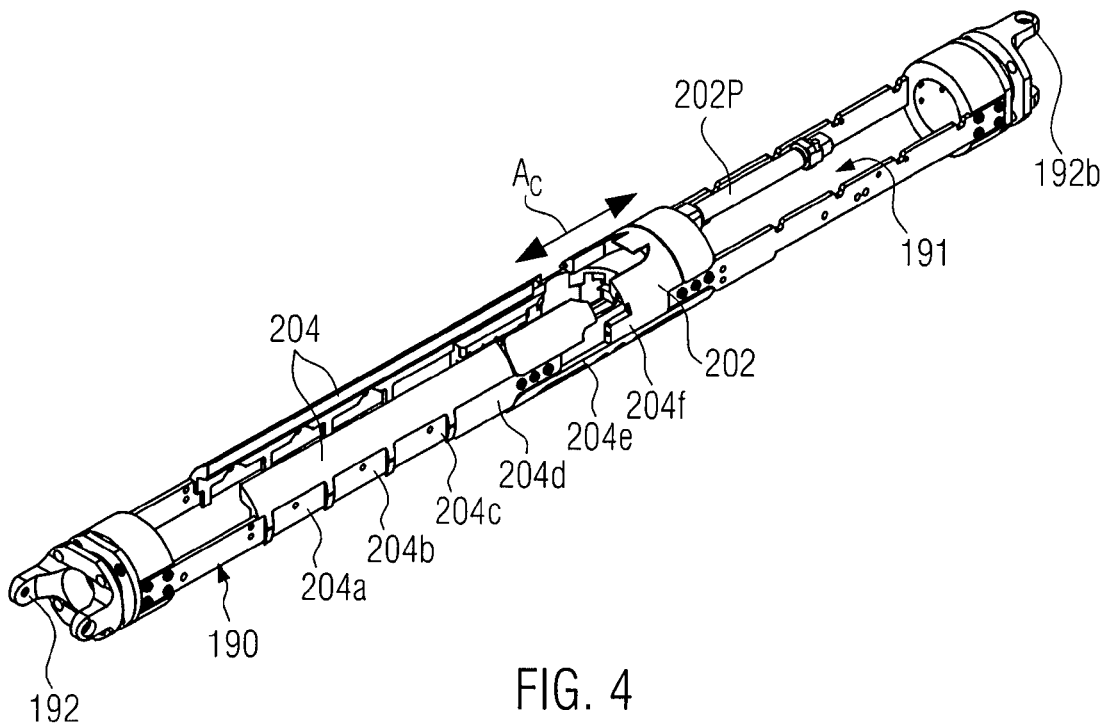
FIG. 4 is a perspective view of the main components of a chassis only of the module of FIG. 3, showing parts of the storage device and a cover which holds the next connection fitting to be installed in position on the installation bed or platform until the insertion device is actuated, the cover being shown in its open position.
Figure 5A:
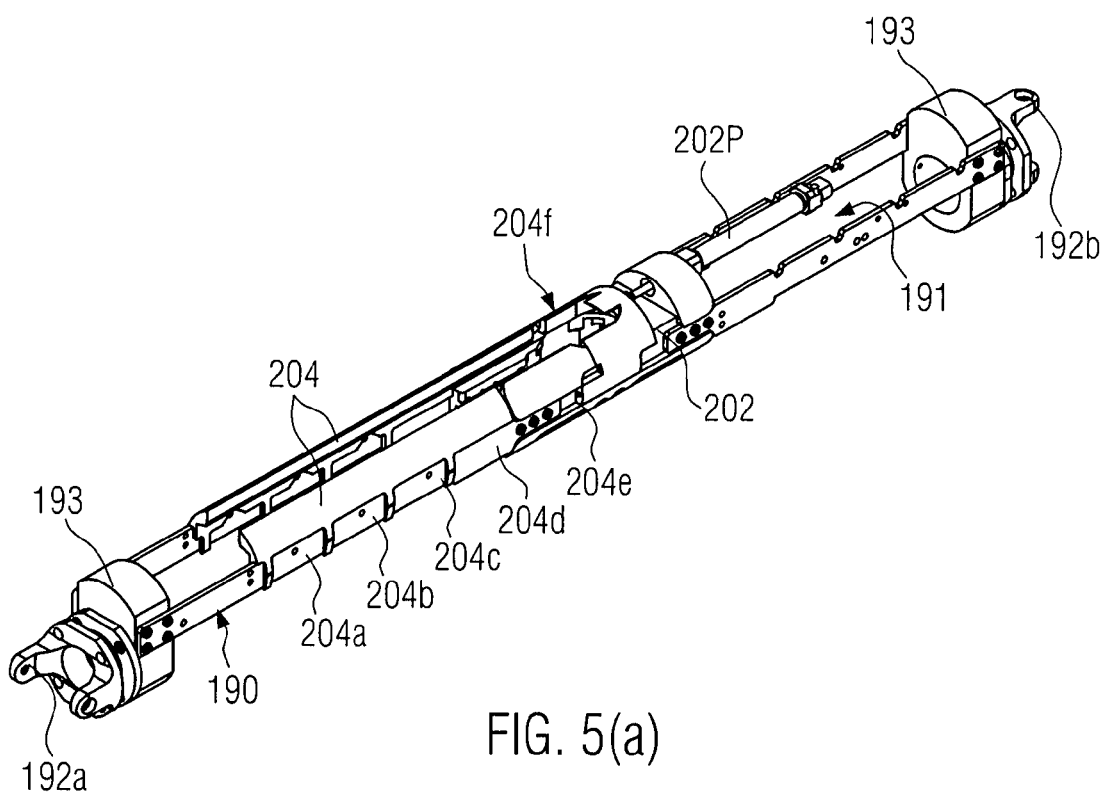
FIG. 5(*a*) is a perspective view of the same chassis and storage device parts as shown in FIG. 4, but showing the cover in its closed position.
FIG. 5(b) is a rear side view of the chassis shown in FIG. 5(a)

Referring firstly to FIGS. 3, 4 and 5(a) & (b), the connection fitting installation module indicated generally as 130 comprises a main chassis or body 190, which may be generally cylindrical in shape with spaces within the structure thereof, such as at 191, for accommodating the various operational components of the module. Such operational components may include one or more pneumatic or electrical components for actuating, operating or controlling any pneumatic, hydraulic or electric components carried onboard the module 130. Also, the module 130 itself may be connected, e.g. via respective end connection devices 192a, 192b, to a neighbouring module of the robot, which connection devices 192a, 192b also make any necessary connections between those adjacent or neighbouring modules for the supply of power or operational signals to components onboard the installation module 130 from elsewhere in the robot, or via the main umbilical cable 100C (FIG. 2).

As shown in FIG. 3, the installation module generally comprises a storage device 200 for storing a supply connection fittings 300 for installation, a conveyance device 220 (see later, as not shown in FIG. 3 since it is concealed in that view) for conveying the connection fittings 300 sequentially towards an installation location from which a next connection fitting to be installed 300N is acted upon by an insertion device 240 (again see later, as mainly concealed in that view) which inserts it into a pre-formed aperture in the main pipeline wall, as will be described further below.

As shown in FIGS. 4 and 5(a) & (b), the chassis 191 of the module comprises most of the components of the storage device 200, which comprises a rack 204 having defined therein a series or linear array of a plurality of storage wells or compartments 204a, 204b, 204c, 204d, 204e, 204f, each for accommodating a respective one of the plurality of connection fittings 300 for storage therein ready for a given series or sequence of installation operations in successive or respective apertures in the main pipeline wall whilst the robot 100 is located therein. Any suitable number of such connection fittings 300 may be loaded onto the rack 204 of the storage device 200 at any one time, although in this illustrated example six such fittings 300 are shown. Of course, however, any other number of fittings, e.g. up to around 10 or more, may be arranged to be accommodatable instead, although the maximum number may depend on the dimensions of the fittings themselves and the longitude dimensions of the rack 204 and the overall module 130 itself.

The storage device 200 includes a slidable cover 202 for temporarily retaining on the insertion device 240 a connection fitting 300N which is next to be installed, until such time as the module has been correctly positioned and aligned and the insertion device 240 ready for actuation. This retention of the next connection fitting 300N ready to be installed may be desirable since when it is in position on the installation pad or platform of the insertion device 240 it may no longer be retained by the edges of the rack 204, and so may be liable to falling out. This may be particularly useful in situations where the module is oriented for carrying out an installation operation other than in an upright position as shown in FIGS. 3 to 5 (e.g. upside down from that orientation shown in those Figures), which may for example be the case when an installation operation is to be carried out on an aperture in a side or bottom wall of the main pipeline. The closing and/or opening of the cover 202 is actuated and controlled by a dedicated pneumatic or hydraulic pressurised fluid device 202P, e.g. using compressed air.

Figure 5B:
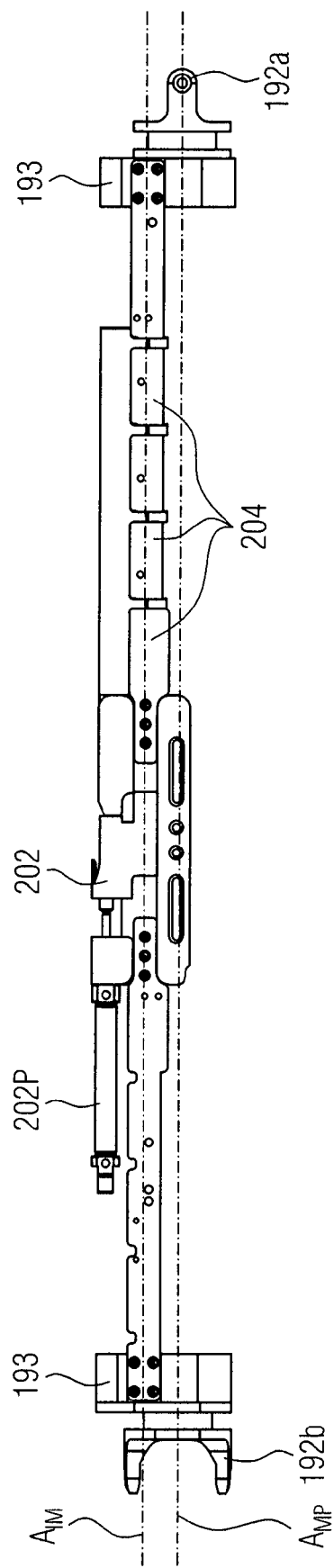

FIG. 5(a) also shows a variant in the design of the end caps 193 of the module chassis 190, where in this case they are extended asymmetrically in respective upper and lower (as shown in the drawing) directions, e.g. so as to be enlarged in a radial or transverse direction to an upper (as shown in the drawing) side thereof. This feature may serve to radially offset the position in which the installation means is mounted in the module 130 relative to the module's central axis. This may serve to place the installation means in closer proximity to many sites at which service connections may be made in a typical pipeline, which may often be towards the upper regions of the pipeline. This may be useful for instance in the case of pipelines of relatively large diameters, where the apparatus or robot may typically travel and bear against the floor or a lower region thereof, yet a limited maximum reach or distance of travel of a typical scissor lifting mechanism, as used for the insertion device, may make it difficult or impossible for the installation pad or platform to fully reach particular insertion locations spaced over large distances from the main structure of the module. This offset configuration is illustrated in FIG. 5(b), which shows the radially offset chassis and storage device arrangement of FIG. 5(a) in side view. As shown there, the line $A_{IM}$ represents the central longitudinal axis of the installation module, whereas the line $A_{MP}$ represents the central longitudinal axis of the main pipeline in which the module 130 is to be navigated and sited for operation.

Turning to FIGS. 6 to 11, these Figures show various views of the conveyance device, indicated generally as 220, which conveys a connection fitting 300N from the storage device 200 towards the installation bed or platform 242, this being the installation location at which is sited the insertion device 240 which actually inserts the conveyed fitting 300N into the aperture in the pipeline wall.

As shown variously in these Figures, the conveyance device 220 comprises a pair of elongate reciprocatable loading arms or plates 222a, 222b located to respective lateral sides of a supporting chassis member 221 and linearly slidable together relative thereto in a selectively reciprocatable manner under actuation and operation of a dedicated pneumatic or hydraulic pressurised fluid device 220P (piston), 230P (pressure cylinder), e.g. using compressed air. The chassis member 221 is anchored, e.g. by screws, to the remainder of the module chassis via a set of e.g. six screw-threaded anchoring lugs or brackets 226.

Each loading arm or plate 222a, 222b carries a respective series of linearly spaced apart engagement members 224a, 224b attached thereto, each engagement member 224a, 224b being attached or mounted at its root end 224aM, 224bM to or on the respective loading arm or plate 222a, 222b. Each engagement member 224a, 224b, which is formed of resilient material, e.g. a resilient plastics material, is formed with an enlarged head portion terminating in a protruding nose portion (e.g. as shown in the drawings), which head portion is joined to the engagement member's root end via an intermediate arm 224aR, 224bR of reduced cross-sectional and/or thickness dimensions, so that the engagement member 224a, 224b is resiliently pivotable relative to its root end mounting by resilient flexing of its intermediate arm portion.

Figure 6:
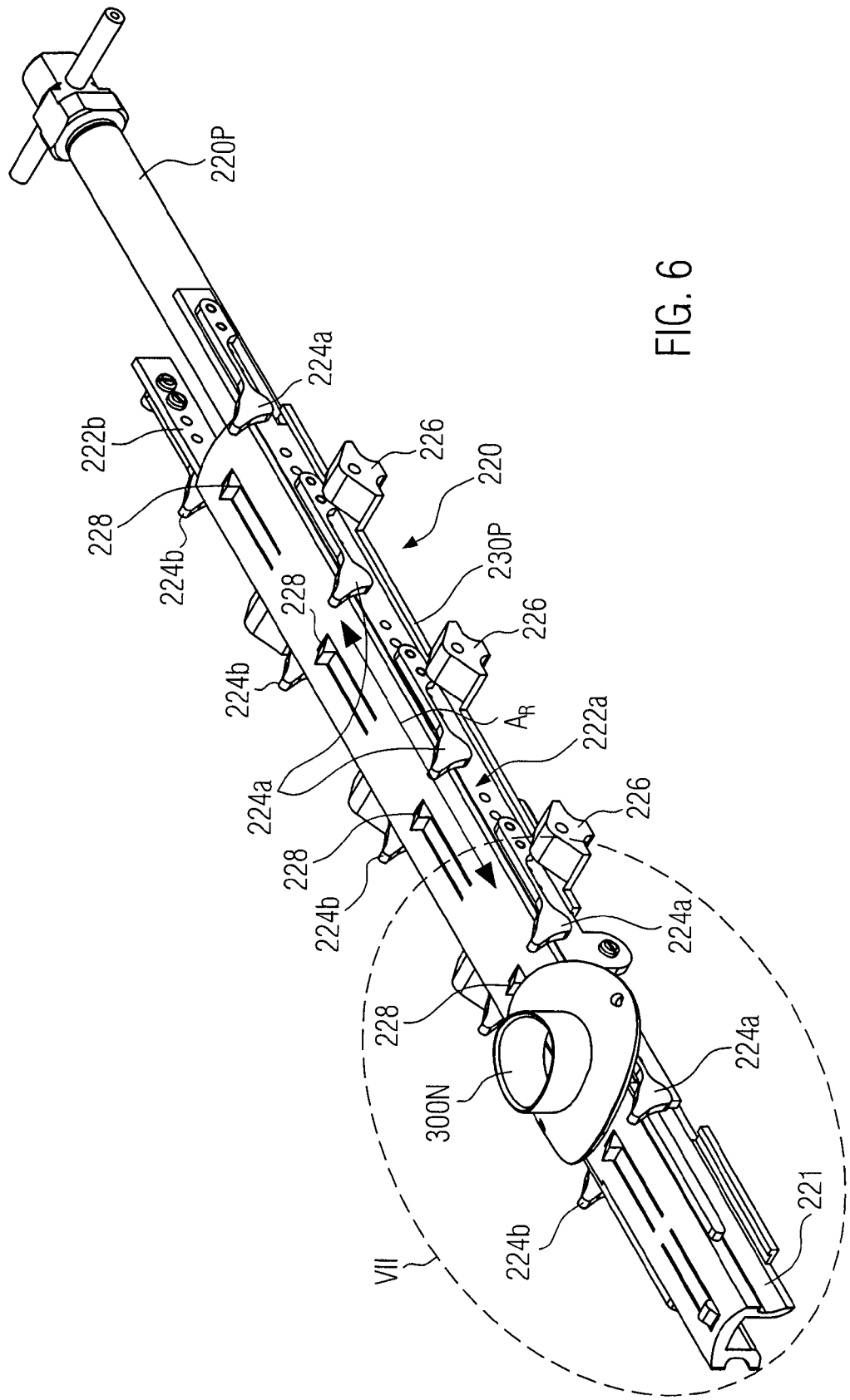
FIG. 6 is a perspective view of a conveyance device incorporated in the module of FIG. 3, showing the manner in which the conveyance mechanism loads a connection fitting onto the installation bed or platform ready for installation.
Figure 7:
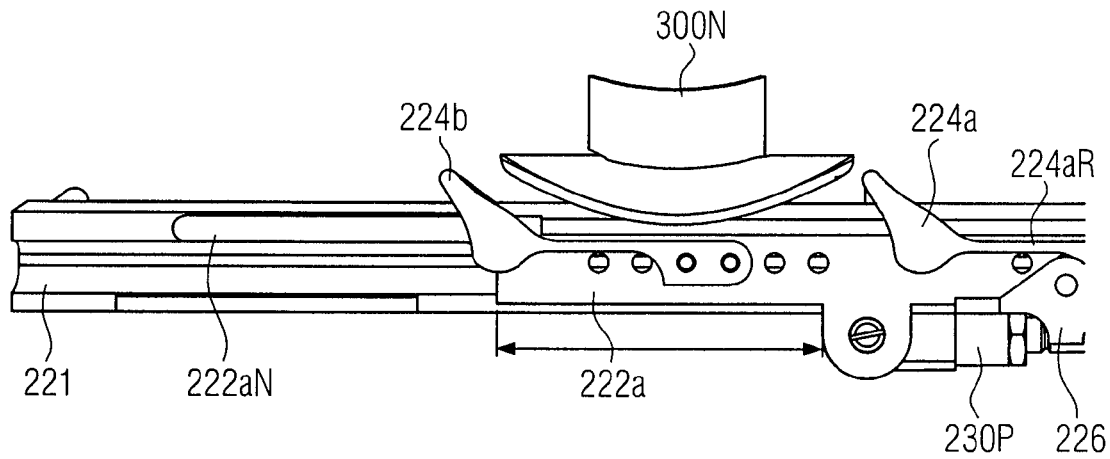
FIG. 7 is an enlarged side view of the ringed portion of the conveyance device of FIG. 6.
Figure 8:
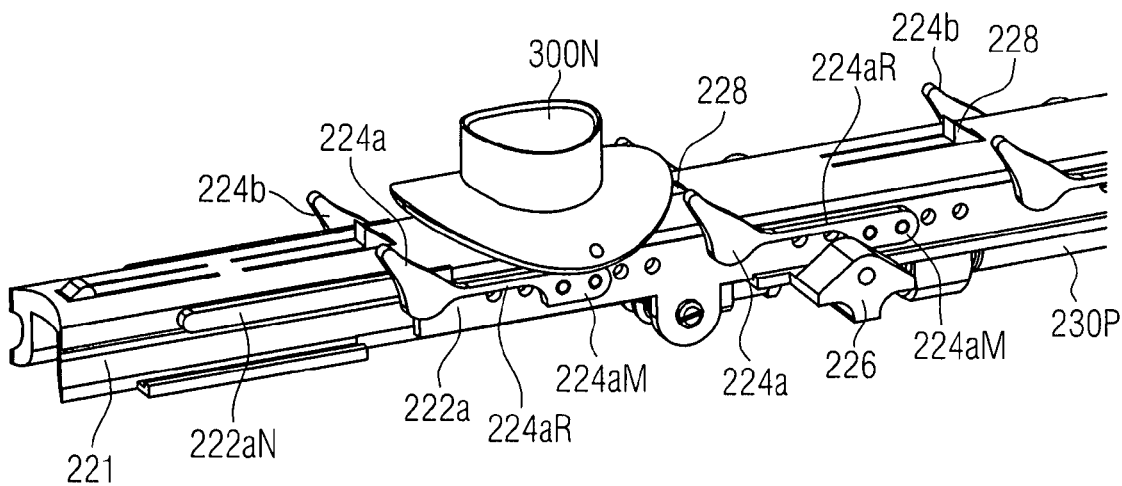
FIG. 8 is an enlarged perspective view of the same portion of the conveyance device as shown in FIG. 7.

The pair of loading arms or plates 222a, 222b are movable together relative to the supporting chassis member 221 or the rack 204 of the storage device (which is fixed to the chassis 221) in a linear, parallel fashion between a retracted (or rearward) position and an advanced (or forward) position, as indicated by arrow $A_R$ (see FIG. 6). Likewise, each engagement member 224a, 224b is pivotally moveable, owing to the resilience of its respective intermediate arm 224aR, 224bR between an engaging pivotal position, in which it is engageable with a respective loading side, edge or portion of a respective connection fitting 300 to be conveyed in the direction of the installation pad or platform 242 (as illustrated particularly in FIGS. 9 to 11) and with which it is associated, and a non-engaging pivotal position, in which it is not engageable with a subsequent or next-in-line connection fitting 300 in the series or array in the storage device 200 (and thus now a new connection fitting at the head of the sequential series or array in the storage device 200 and so the next to be installed). Such an assuming of its non-engaging pivotal position may for example be by virtue of the shape or configuration of the respective engagement member 224a, 224b causing it to be pivotally forced into its non-engaging position by the subsequent or next-in-line connection fitting 300 in the series or array in the storage device 204 as the respective engagement member 224a, 224b passes thereby during its retractive movement in the retractive direction.

The configuring of the respective engagement members 224a, 224b into either their engaging or non-engaging pivotal positions is effected by the direction of movement of the loading arms or plates 222a, 222b and the relevant interactions of the respective engagement members 224a, 224b with the connection fittings 300 housed in the rack 204 of the storage device 200.

Figure 9:
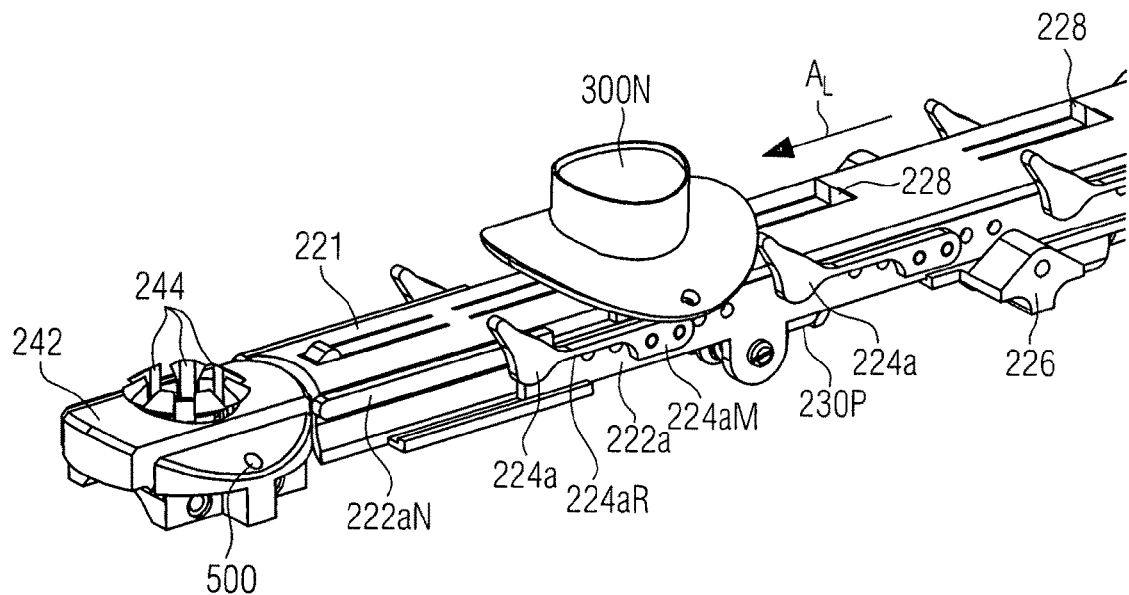
FIG. 9 is an enlarged perspective view of the same portion of the conveyance device as shown in FIG. 8, including now the installation bed or platform, showing a first stage in the process of conveying a connection fitting from the storage device towards the installation bed or platform.
Figure 10:
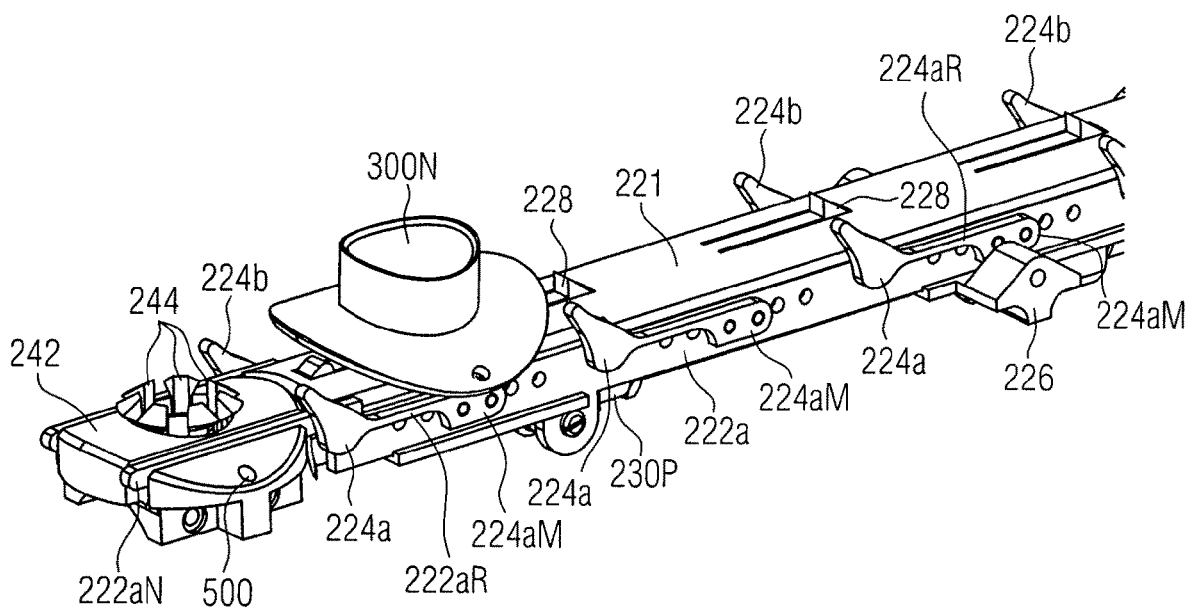
FIG. 10 is an enlarged perspective view of the same portion of the conveyance device as shown in FIG. 8, including now the installation bed or platform, but showing a second stage, subsequent to that shown in FIG. 9, in the process of conveying the connection fitting from the storage device towards the installation bed or platform.

Thus, the arrangement here is such that:

(i) as shown in FIGS. 9, 10 and 11(b), as the loading arms or plates 222a, 222b are moved from their retracted (rearward) position towards their advanced (forward) position, i.e. in a loading direction, each respective pair of engagement members 224a, 224b assumes their engaging pivotal position so as to engage the said respective loading side, edge or portions of the respective connection fitting 300 that is associated with that pair, and thereby to convey it towards the installation pad or platform 242, and (ii) as shown in FIGS. 9, 10 and 11(a), as the loading arms or plates 222a, 222b are moved subsequently from their advanced (forward) position towards their retracted (rearward) position, i.e. in a retractive direction, the same engagement members 224a, 224b assumes their non-engaging pivotal position so as not to engage a subsequent or next-in-line connection fitting 300 in the series or array in the storage device (and thus now a new connection fitting at the head of the sequential series or array in the storage device 200 and so the next to be installed). Such an assuming of a non-engaging pivotal position may for example be by virtue of the shape or configuration of the engagement members 224a, 224b causing them to be pivotally forced into their non-engaging position by the subsequent or next-in-line connection fitting 300 in the series or array in the storage device 200 as the respective engagement members 224a, 224b pass thereby during their retractive movement in the retractive direction.

In this manner upon each repetition of the aforementioned movement of the loading arms or plates 222a, 222b firstly in the loading direction, i.e. from their retracted (rearward) position towards their advanced (forward) position, and secondly (and subsequently) in the reverse, retractive direction from their advanced (forward) position towards their retracted (rearward) position, the series or array of connection fittings 300 loaded onto the storage device 200 is incrementally advanced towards the installation pad or platform 242, with a new one such connection fitting 300N becoming that at the head of the series or array in the storage device 200 upon each successive reciprocation of the arrangement after each respective connection fitting 300 has been installed.

During movement of the loading arms or plates 222a, 222b in the rearward, retractive direction, any tendency for the connection fittings in the series or array in the rack 204 of the storage device 200 to move in the same rearward, retractive direction, relative to the rack 204 on which they are carried, is substantially prevented or resisted by the provision on or in an upper portion of the rack 204 of one or more respective anchoring tabs 228 protruding therefrom.

Each respective anchoring tab 228 is configured to engage the loading side, edge or portion of the respective connection fitting 300 during the rearward, retractive movement of the loading arms or plates 222a, 222b. Thus, such one or more anchoring tabs 228 serve to substantially prevent any longitudinal relative movement between the connection fittings 300 in the series or array in the rack 204 of the storage device 200 and the rack 204 of the storage device 200 itself except for when the loading arms or plates 222a, 222b move, relative to the rack 204, in the loading direction.

Note as shown in FIGS. 9 and 10, that the installation pad or platform 242 may if desired carry one or more seating or retaining detents or protrusions 244, e.g. one or more resilient jaws, as illustrated, for frictional or interference engagement with an internal wall or channel or groove in the relevant connection fitting to be seated thereon ready for installation, in order to assist its retention on the pad or platform 242 until the insertion device is actuated to perform the insertion operation. This may be particularly useful in cases where the module is to be oriented, for effecting the insertion operation, in a generally sideways or even a generally upside-down or inverted orientation, i.e. an orientation other than a generally upright orientation, relative to that shown in the Figures.

Note finally here that, as shown in FIG. 10, when the loading arms or plates 222a, 222b are at their maximum advanced, forward position, their respective nose portions 222aN, 222bN extend to cover a lateral side portion of the installation pad or platform, thereby preventing its lifting/raising by the insertion device, except for when a next connection fitting 300 to be installed has already been appropriately placed thereon by the conveyance device 220.

Referring now to FIGS. 12 to 17, these Figures show various views of the construction and operation of the insertion device, indicated generally as 240, which actually effects the insertion into the aperture 400A in the wall of the main pipeline 101 (FIG. 14) of the relevant connection fitting 300N at the head of the series or array and which has now been conveyed onto the installation pad or platform 242 ready for installation.

The insertion device 240 comprises a scissor lift-type mechanism 250, which is constructed and operates in much the same way as conventional types of scissor-type lifts used for instance in lifting tables or platforms for various engineering and materials handling applications, so its construction and operation on the present context will be well understood by the skilled person with minimal detailed explanation. (Although the expression "lift" is being used here to describe the advancement action or movement performed on or by the installation pad or platform 242, it is to be understood that this action/movement may occur in any spatial orientation, not necessarily in an upward direction as shown in these drawings (as the term "lift" might literally suggest). For example, depending on the overall orientation of the installation module in the pipeline, this "lifting" movement may in reality occur not only in a generally upward direction, but instead it may occur in a generally sideways (e.g. generally horizontal) or even a generally downward direction, or any angle inbetween any of these particular directions.)

The lift mechanism 250 which lifts the installation pad or platform 242 comprises two pairs of scissor frame members 250R, 252R; 250F, 252F, which in each pair are pivotally attached as at 254PR, 254PF, with the upper end of each primary frame member 250R, 250F being pivotally attached to the underside of the installation pad or platform 242. The lower end of each secondary frame member 252R, 252F is pivotally attached to a fixed anchoring on the chassis of the apparatus or module. The lower end of each primary frame member 250R, 250F is attached, via a respective pivotal connection 252PR, 252PF to a respective piston rod, as seen more clearly in FIGS. 12(a) and 12(b). Each of the rearward pair of frame members 250R, 252R is attached to its own respective outer piston rod 262a, 262b (via respective attachment sleeves 262aA, 262bA), each of which slides through a respective slide bearing therefor, whereas the two pairs of forward frame members 250F, 252F are both attached, via common attachment sleeve 260A, to a single, central piston rod 260, which likewise slides through a respective slide bearing therefor.

Figure 12A:
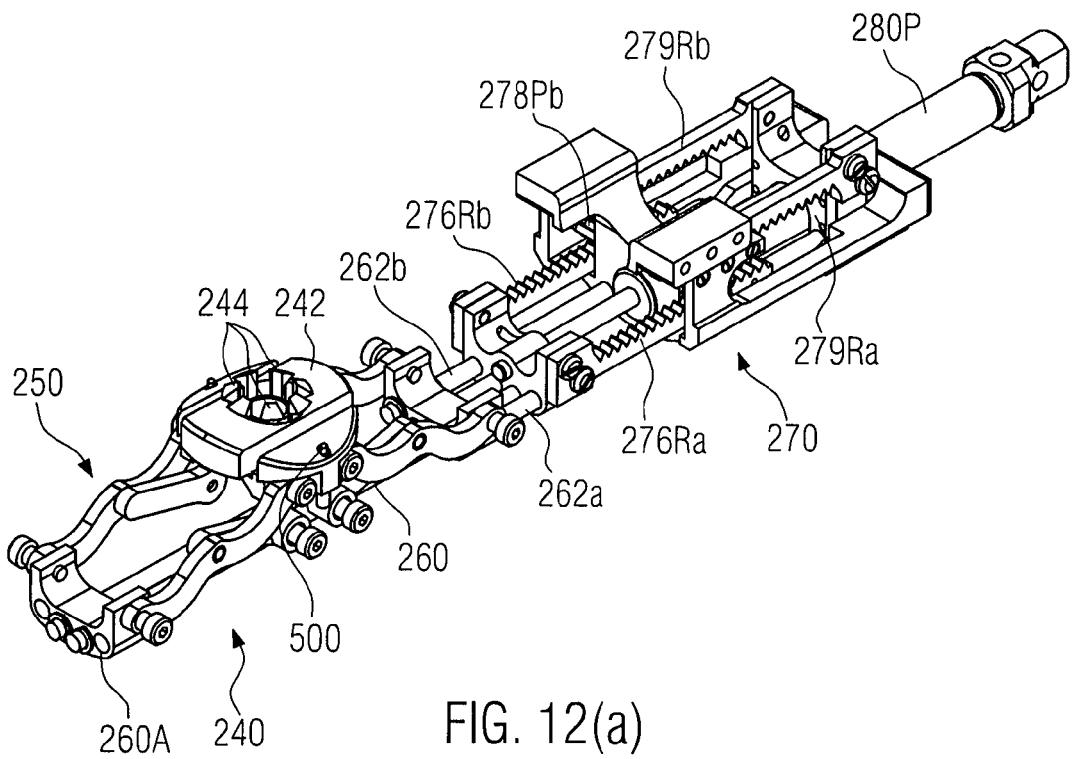
FIG. 12(a) is a perspective view of an insertion device incorporated in the module of FIG. 3, showing the scissor lift and rack and pinion referral mechanisms thereof, and illustrating the scissor lift mechanism in a lowered, i.e. retracted, configuration.
Figure 12B:
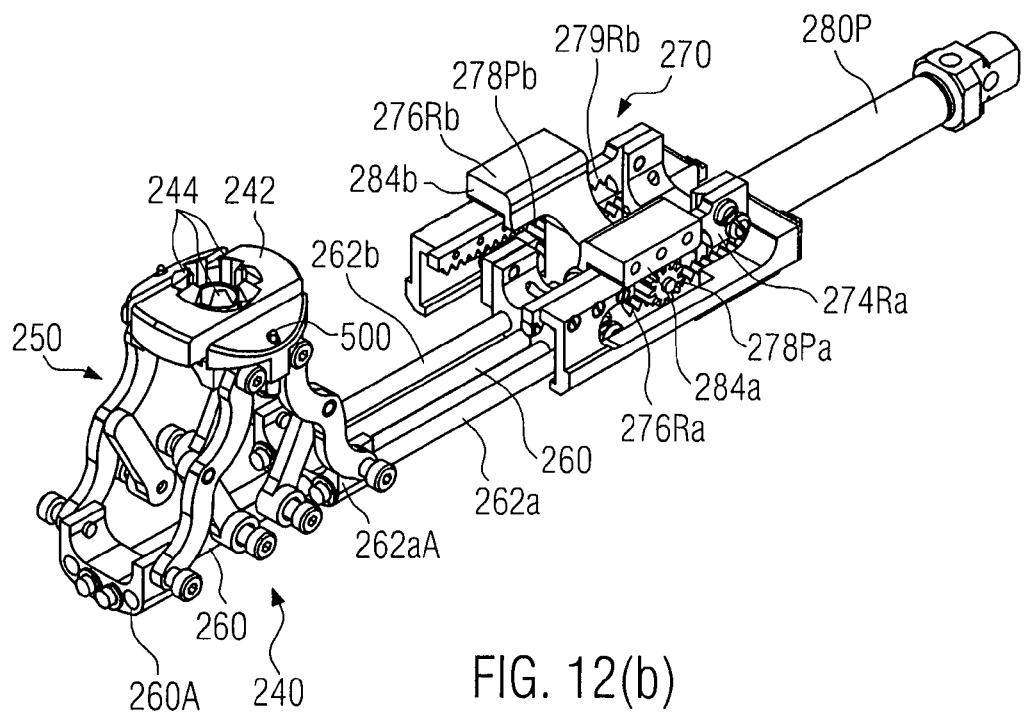
FIG. 12(b) shows the same arrangement as in FIG. 12(a), but illustrating the scissor lift mechanism in a raised, i.e. advanced, configuration.
Figure 13A:
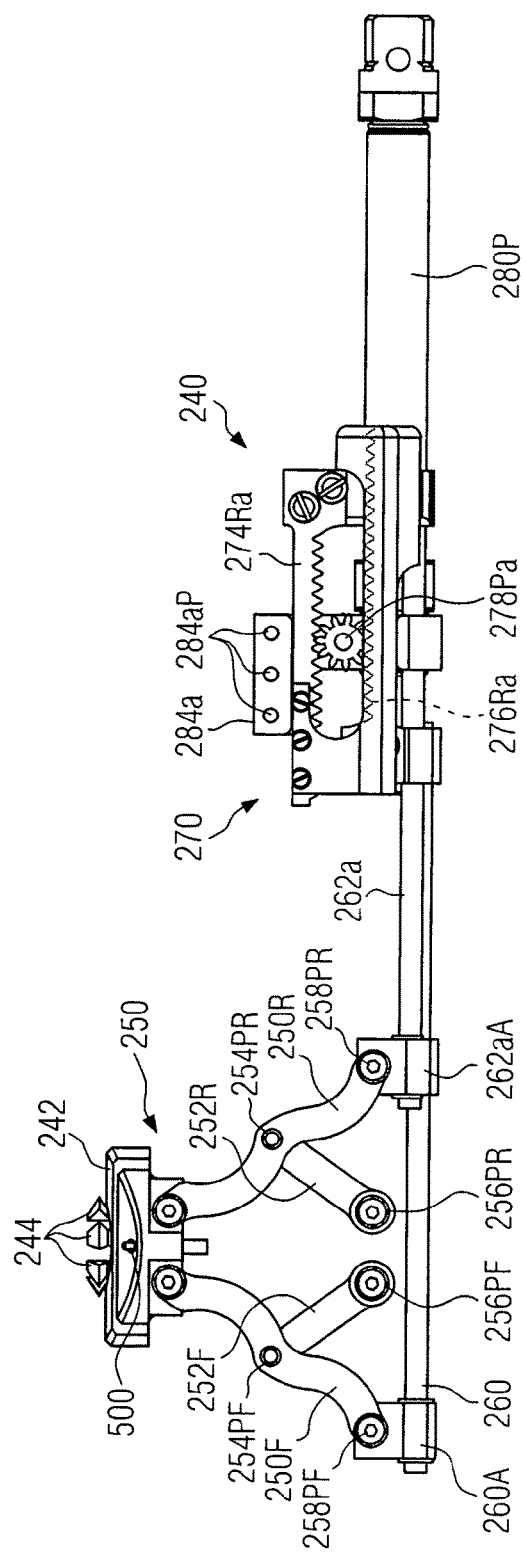
FIG. 13(a) is a front side view of the arrangement shown in FIG. 12(b)
Figure 13B:
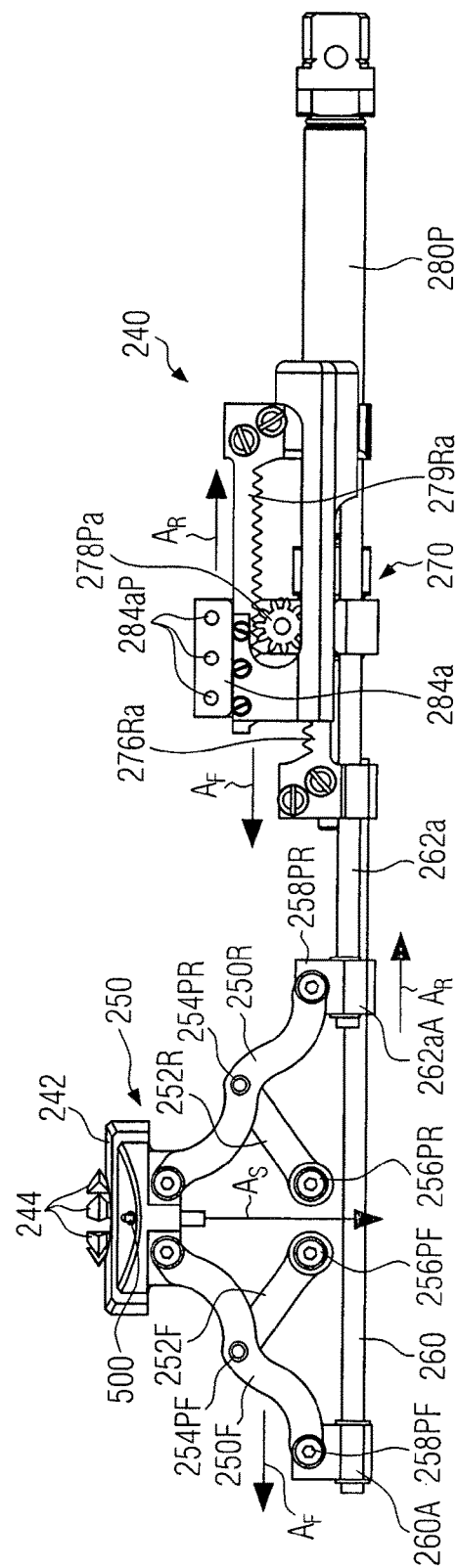
FIG. 13(b) is a front side view of the arrangement shown in FIG. 12(a)
Figure 14:
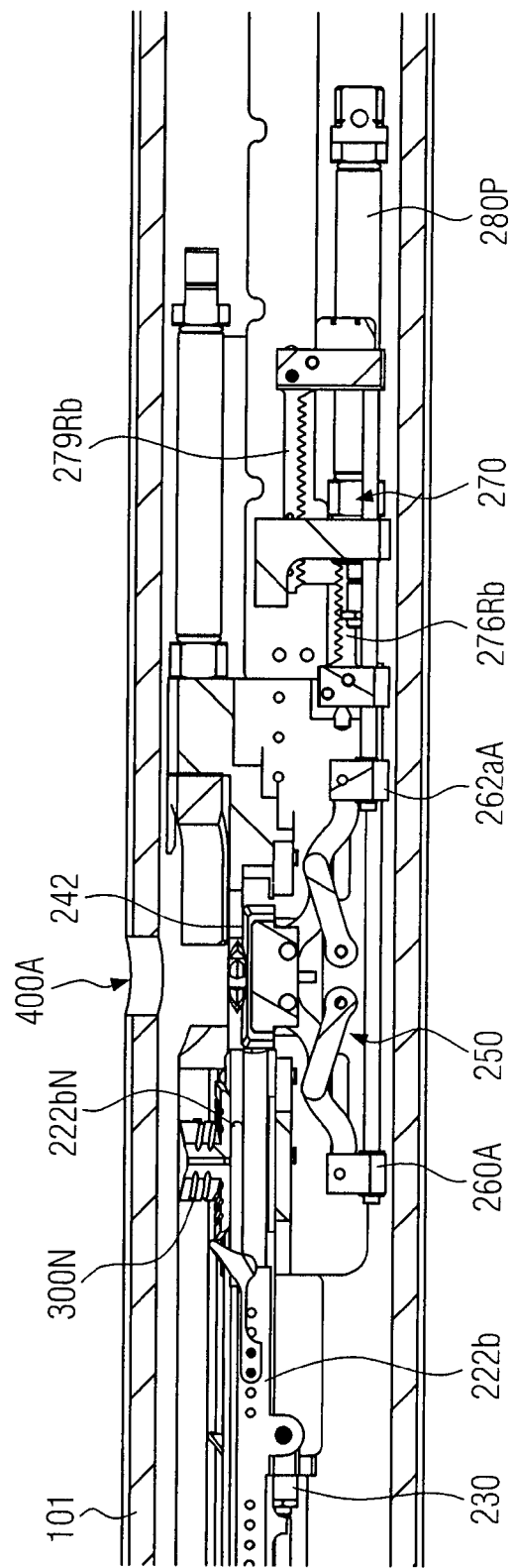
FIG. 14 is a cross-sectional, part-cut-away, view of a major portion of the installation module of FIG. 3, shown in a main pipeline and with the conveyance device about to convey a connection fitting to the installation pad or platform ready for installation by the scissor-lift-operated insertion device.

The various piston rods 262a, 262b, 260 are acted on to effect the required directions of movement of the various members of the scissor frame by a pair of rack and pinion reversal mechanisms 270, which are seen in particular in FIGS. 12(a) & (b) and 13(a) & (b). A single common pressure cylinder 280P is used to actuate and control the movement of the various piston rods via the respective rack and pinon reversal mechanisms. Each rack and pinion mechanism is anchored to the chassis of the module by respective mounting blocks 284a, 284b. The rack and pinion mechanisms each operate in a conventional manner, so as to cause (i) the pair of outer piston rods 262a, 262b, and (ii) the single central piston rod 260 to move in respective opposite directions from each other, both when either set of piston rod(s) (i) or (ii) is performing a "push" or a "pull" movement, as represented by arrows $A_F$ and $A_R$ in FIG. 13(b). The respective racks 276Ra, 279Ra; 276Rb, 279Rb and the respective pinions 278Pa; 278Pb operate in a convention manner to reverse the direction of movement of each set of piston rod(s) (i) and (ii), so will be readily understood by the skilled person without further detailed explanation. Accordingly, in this manner the scissor lift mechanism 250, under the actuation and control of the rack and pinon mechanisms 270, act to selectively advance (lift) or retract (lower) the installation pad or platform 242 as or when required, in order to effect insertion of a connection fitting located thereon into a required aperture 400A (FIGS. 14 & 15) in the wall of the main pipeline 101.

If desired or necessary a small camera (not shown) may be located in the installation pad or platform 242 to assist in making a correct alignment thereof with the aperture 400A prior to actuation of the insertion mechanism.

Figure 15:
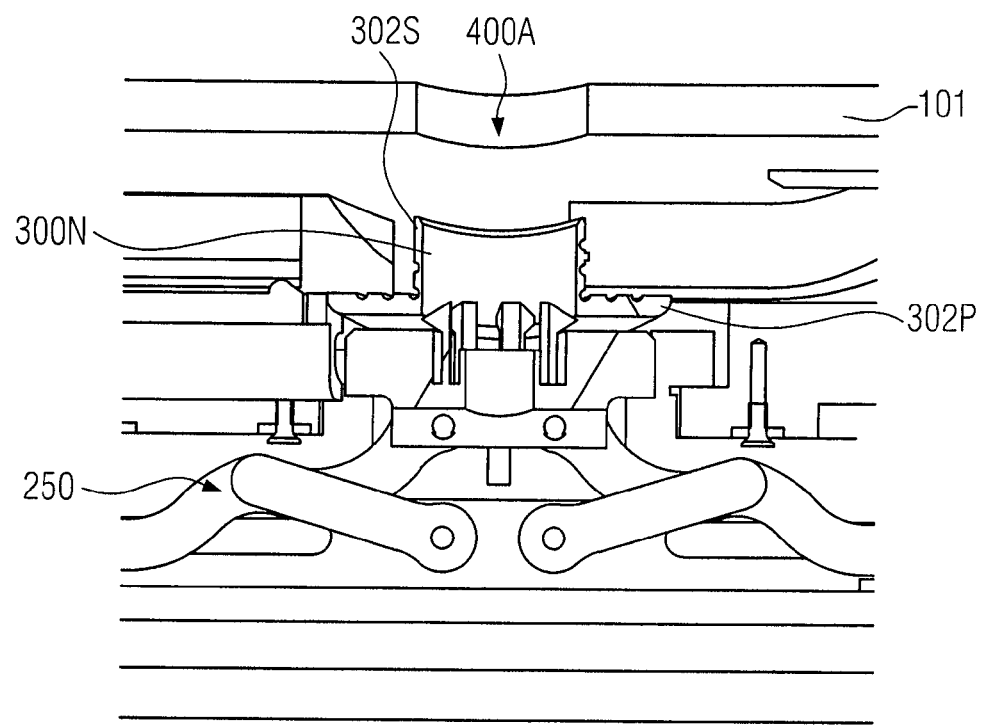
FIG. 15 is a close-up cross-sectional, part-cut-away, view of the central portion of the arrangement shown in FIG. 14, showing the connection fitting in position on the installation pad or platform and about to be inserted into the aperture in the pipeline wall by the scissor-lift-operated insertion device.
Figure 16:
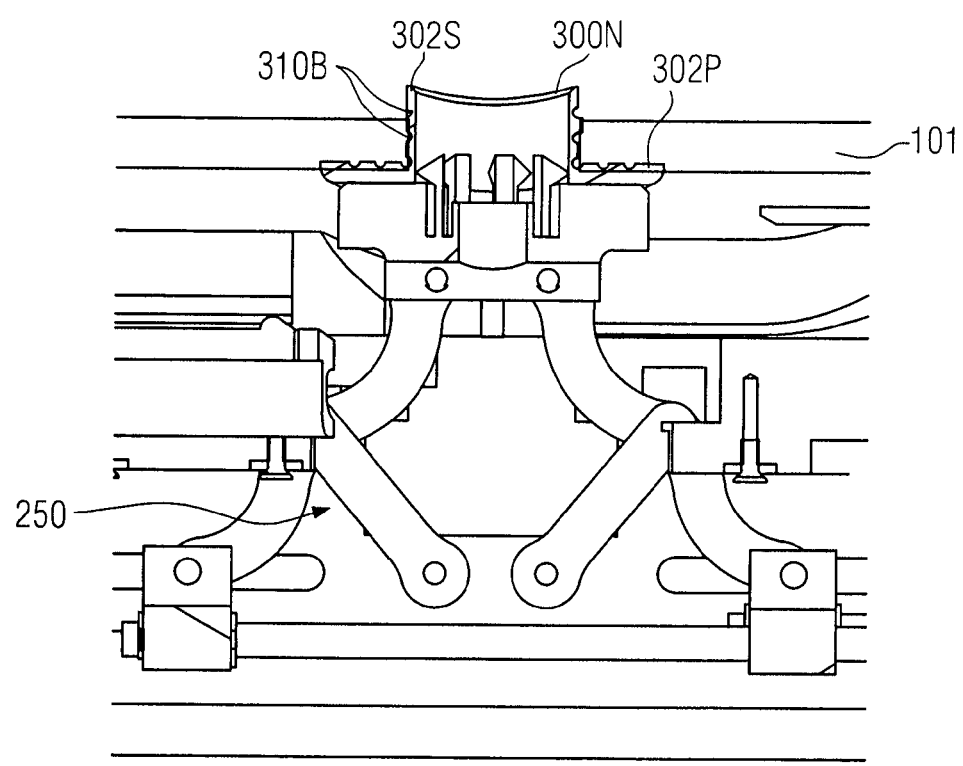
FIG. 16 is a close-up cross-sectional, part-cut-away, view of the same arrangement as shown in FIG. 15, but showing the connection fitting in the process of being inserted into the aperture in the pipeline wall upon raising of the scissor-lift-operated insertion device into its advanced configuration.

As shown by way of example in FIGS. 15 and 16, if desired or necessary a connection fitting 300 may be formed with one or more external barbs or outward protrusions 310B on either or both of its primary connection portion 302P (via which it connects to the inner wall of the main pipeline, especially in the region(s) immediately surrounding or adjacent the aperture 400A) and/or secondary connection portion 302S (via which it connects to the interior of the aperture 400A itself and optionally also to the side connection pipeline or conduit liner inserted therein itself).

A typical connection fitting per se is shown in FIGS. 18(a) and 18(b). Conveniently it is an electrofusion-type connection fitting, in which an electrical conductor, especially an elongate (e.g. coiled) length of conductive heatable (electrofusion) wire, is embedded —during the manufacture of the fitting, such as by injection moulding —in one or more internal channels 320C, 322C in the fusible (e.g. plastics) material of the fitting. Provision is made, as at contact holes 325E1 and 325E2, for the connection and supply of electric current to the internal electrofusion wire within the fitting as or when required, such as by connection thereto of a discrete component, e.g. a spring pin device, of the module which is designed for this purpose, e.g. provided on or within the construction of the installation pad or platform 242. By way of example, suitable such connection points therefor are shown as 500 in FIGS. 9, 10, 11 and 12.

Thus, by operation of this electrofusion mechanism, the necessary or desired primary and secondary welds and/or seals 320PW, 320SW (FIG. 14) can be made to complete the installation of the connection fitting 300N, and in particular to complete the formation of secure, stable and fluid-tight connections (i) between the primary connector portion 302P of the fitting and the inner wall of the main pipeline 101 surrounding the aperture 400A, and (ii) between the secondary connector portion 302S of the fitting and (e.g. externally thereof) the inner walls of the aperture 400A itself and (e.g. internally thereof) the side connection pipeline or conduit/liner inserted therein (if used).

Having now been already well-defined and well-described, the sequential stages of the procedure for the installation of a connection fitting 300 into an aperture formed in the inner wall of the main pipeline 101 may be further understood by the following further description, by way of a typical example, of the key steps in the procedure (it being understood that as a prelude to these steps there has already been performed a step—as described hereinabove—of drilling an aperture or hole in the wall of the main pipeline 101 at the desired location opposite the mouth or exit of a side or service connection pipeline C, via which the relevant service connection is to be made:

1. The drive module 110 of the robot is engaged to move the installation module 130 into position facing a pre-drilled hole in the main pipeline wall.
2. A camera in installation pad or platform 242 used to align the installation pad/platform 242 with the pre-drilled hole (e.g. using machine vision as feedback).
3. The installation pad/platform 242 is lowered.
4. If a connection fitting is not already loaded on the installation pad/platform 242, the conveying device is actuated, thereby conveying a connection fitting 300N onto the installation pad/platform 242.
5. With the connection fitting cover 202 closed over the installation pad/platform 242, the installation pad/platform 242 is raised. The connection fitting cover 202 acts to push and retain the connection fitting 300N securely onto the installation pad/platform 242.
6. The installation pad/platform 242 is lowered.
7. The connection fitting cover 202 is retracted out of the way.
8. The installation pad/platform 242 is raised by the scissor lift mechanism.
9. The connection fitting 300N should be retained in the pipe wall aperture by either friction generated by the press fitting of the connection fitting 300N into the wall of the main pipeline, or by another retaining feature such as a set of barbs/flexible tabs which allow the connection fitting 300N to be retained in the aperture in the main pipeline wall.
10. The installation pad/platform 242 is lowered.
11. The connection fitting cover 202 is moved back into place to its position over the installation pad/platform 242.
12. Optionally, another connection fitting can now be conveyed onto the installation pad/platform 242 ready for another installation operation at a different site, by repeating the above steps.

Subsequently or finally, any further or additional steps of the overall procedure may be carried out at the site of the thus-made service connection by one or more other respective modules of the robot, e.g. one or more leak test procedures and/or one or more cleaning-up operations.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for installing a connection fitting into an aperture formed in a wall of a main pipeline in making of a service connection between a side connection pipeline and the main pipeline, wherein the apparatus comprises:
   a drive module configured to propel the apparatus along the main pipeline to a site at which the service connection is to be made; and
   an installation module configured to install, from within the main pipeline, at least a portion of the connection fitting into the aperture,
   wherein the installation module comprises:
   (i) a storage device for storing at least one connection fitting intended for installation;
   (ii) a conveyance device for conveying a connection fitting to be installed from the storage device to an installation location; and
   (iii) an insertion device for inserting the connection fitting conveyed to the installation location from the installation location into the aperture formed in the wall of the main pipeline, wherein the insertion device comprises a displacement device constructed and arranged for advancing and/or retracting an installation bed or platform into and/or from an insertion relationship with the aperture in the wall of the main pipeline.

2. The apparatus according to claim 1, wherein the storage device is constructed and arranged for storing a plurality of connection fittings in a sequential series or array.

3. The apparatus according to claim 1, wherein the storage device is constructed and arranged such that only that connection fitting intended next to be installed is able to be acted on by the conveyance device for conveying it to the installation location.

4. The apparatus according to claim 1, wherein the storage device comprises a storage rack for storing the said connection fitting(s) thereon or therein.

5. The apparatus according to claim 4, wherein the storage rack comprises a retaining device configured to retain the or each connection fitting thereon until it becomes that one at a head of a sequential series or array and next intended to be installed.

6. The apparatus according to claim 1, wherein the conveyance device comprises a translating device configured to translationally convey at least the fitting next to be installed from the storage device to the installation location.

7. The apparatus according to claim 6, wherein the translating device is constructed and arranged for conveying incrementally in the direction of the installation location all the connection fitting(s) stored in the storage device, such that upon each incremental translational movement a sequential connection fitting in a series or array becomes the next one conveyed to the installation location ready for installation.

8. The apparatus according to claim 6, wherein the translating device comprises at least one reciprocatable loading member arranged for reciprocating movement relative to the storage device, and at least one engagement member carried on the or a respective loading member for engagement with a respective connection fitting to be conveyed in the direction of the installation location, said engagement being such as to convey, upon movement of the or the respective loading member in a loading direction, the said respective connection fitting towards the installation location.

9. The apparatus according to claim 8, wherein the translating device comprises a pair of reciprocatable loading members located to respective opposite lateral sides of the storage device and moveable together in like reciprocating movement relative to the storage device, with each loading member carrying thereon a respective one of at least one pair of engagement members for engagement with a respective loading side, edge or portion of the said respective connection fitting to be conveyed in the direction of the installation location, said engagement of the engagement members being such as to convey, upon movement of the pair of loading members in the loading direction, the said respective connection fitting towards the installation location.

10. The apparatus according to claim 9, wherein during movement of the or the respective loading member(s) in a rearward, retractive direction, any tendency for the said connection fitting(s) in the series or array in the storage device to move in the same rearward, retractive direction, relative to a bed of the storage device on which it is carried, is substantially prevented or resisted by a provision on or in the storage device of one or more respective anchoring tabs.

11. The apparatus according to claim 1, wherein the installation location is a portion of an installation pad or platform.

12. The apparatus according to claim 11, further comprising a device configured to prevent the insertion device advancing in an insertion direction the installation pad or platform except for when a next connection fitting to be installed has already been appropriately placed thereon by the conveyance device.

13. The apparatus according to claim 1, wherein the displacement device comprises a scissor lift mechanism.

14. The apparatus according to claim 13, wherein the scissor lift mechanism is operated by one or more pressurised fluid devices, supplied by one or more cylinders or other reservoirs of pressurised fluid which is/are carried in or on the apparatus.

15. The apparatus according to claim 13, wherein the scissor lift mechanism which advances or retracts the installation bed or platform towards or away from the aperture in the main pipeline wall as or when required comprises a scissor frame which carries the installation bed or platform, and one or more actuators which act on the scissor frame to advance or retract, as the case may be, the installation bed or platform in a transverse direction.

16. The apparatus according to claim 1, further comprising at least one welding device for effecting, from within the main pipeline, one or more welding and/or sealing operations in the installation of the connection fitting, wherein the or a respective welding device is constructed and configured for forming at least a primary weld joint, and also a primary seal, between a primary connector portion of a connection fitting already inserted into the aperture in the main pipeline wall at the site at which the service connection is to be made, and the main pipeline wall.

17. The apparatus according to claim 16, wherein the or the respective said welding device, or another respective welding device, is constructed and configured for forming at least a secondary weld joint, and also a secondary seal, between a terminal end of the side connection pipeline, or a terminal end or end portion of a side connection conduit or liner inserted into the side connection pipeline in an earlier step in the overall procedure for the making of the service connection, and a secondary connector portion of the connection fitting already inserted into the aperture in the main pipeline wall at the site at which the service connection is to be made.

18. A system for installing a connection fitting into an aperture formed in a wall of a main pipeline in the making of a service connection between a side connection pipeline and the main pipeline, wherein the system comprises:
(i) an installation module according to claim 1; and
(ii) a controller configured to control actuation and operation of the apparatus or robot or one or more components thereof.

19. A method of installing a connection fitting into an aperture formed in a wall of a main pipeline in the making of a service connection between a side connection pipeline and the main pipeline, the method comprising:
providing an apparatus according to claim 1;
inserting the apparatus into the main pipeline and propelling it therealong to a site at which the service connection is to be made; and
operating the installation module to install, from within the main pipeline, at least a portion of the connection fitting into the aperture.

* * * * *